United States Patent
Kim et al.

(10) Patent No.: US 12,081,776 B2
(45) Date of Patent: Sep. 3, 2024

(54) DISPLAY DRIVER CIRCUIT SUPPORTING OPERATION IN A LOW POWER MODE OF A DISPLAY DEVICE

(71) Applicant: SAMSUNG ELECTRONICS CO., LTD., Suwon-si (KR)

(72) Inventors: Woojoo Kim, Seoul (KR); Seongmin Cheon, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 126 days.

(21) Appl. No.: 18/050,515

(22) Filed: Oct. 28, 2022

(65) Prior Publication Data

US 2023/0083748 A1 Mar. 16, 2023

Related U.S. Application Data

(63) Continuation of application No. 17/060,127, filed on Oct. 1, 2020, now Pat. No. 11,496,753, which is a continuation of application No. 16/150,365, filed on Oct. 3, 2018, now Pat. No. 10,834,411.

(30) Foreign Application Priority Data

Mar. 22, 2018 (KR) .................. 10-2018-0033421

(51) Int. Cl.
*H04N 19/184* (2014.01)
*H04N 19/156* (2014.01)
*H04N 19/426* (2014.01)

(52) U.S. Cl.
CPC ......... *H04N 19/184* (2014.11); *H04N 19/156* (2014.11); *H04N 19/428* (2014.11)

(58) Field of Classification Search
CPC ... H04N 19/184; H04N 19/428; H04N 19/156
See application file for complete search history.

(56) References Cited

U.S. PATENT DOCUMENTS

| | | |
|---|---|---|
| 5,790,556 A | 8/1998 | Matsumoto |
| 6,115,150 A | 9/2000 | Nakamura et al. |
| 7,737,939 B2 | 6/2010 | Shin et al. |
| 8,970,605 B2 | 3/2015 | Cha |
| 9,196,187 B2 | 11/2015 | Holland et al. |

(Continued)

FOREIGN PATENT DOCUMENTS

| | | |
|---|---|---|
| CN | 101562749 | 10/2009 |
| CN | 103065604 | 4/2013 |

(Continued)

*Primary Examiner* — Shawn S An
(74) *Attorney, Agent, or Firm* — F. CHAU & ASSOCIATES, LLC

(57) ABSTRACT

A display driver circuit configured to drive a display panel includes a memory, a decoder, and a controller. The memory stores first data using data from outside of the display driver circuit. The decoder decodes the stored first data. The controller generates compression data using the decoded first data. While an image based on the decoded first data is displayed on the display panel, when second data based on the data from the outside are not stored in the memory after the first data are stored in the memory, the controller controls the decoder such that the decoder does not operate and controls the memory such that the compression data are stored in the memory.

10 Claims, 15 Drawing Sheets

(56) References Cited

U.S. PATENT DOCUMENTS

| | | |
|---|---|---|
| 9,257,100 B2 | 2/2016 | Han et al. |
| 9,514,511 B2 | 12/2016 | Lee et al. |
| 9,927,865 B2 | 3/2018 | Heo et al. |
| 10,366,669 B2 | 7/2019 | Bae et al. |
| 10,430,918 B2 | 10/2019 | Kim et al. |
| 10,503,280 B2 | 12/2019 | Yoo et al. |
| 10,672,097 B2 | 6/2020 | Bae et al. |
| 10,834,411 B2 | 11/2020 | Kim et al. |
| 2009/0104249 A1 | 4/2009 | Schlievert et al. |
| 2009/0257485 A1 | 10/2009 | Youn |
| 2010/0220781 A1 | 9/2010 | Ikeuchi et al. |
| 2010/0246662 A1 | 9/2010 | Koto et al. |
| 2012/0182163 A1 | 7/2012 | Cho et al. |
| 2013/0202050 A1 | 8/2013 | Koto et al. |
| 2014/0104249 A1 | 4/2014 | Furihata et al. |
| 2014/0168237 A1 | 6/2014 | Lee |
| 2015/0059674 A1* | 3/2015 | Washino ............... F16D 57/002 188/267.2 |
| 2017/0025055 A1 | 1/2017 | Kim et al. |
| 2017/0142434 A1 | 5/2017 | Gu |
| 2017/0178594 A1 | 6/2017 | Hasselgren et al. |
| 2017/0353728 A1 | 12/2017 | Huang et al. |
| 2018/0330691 A1* | 11/2018 | Li ....................... G09G 3/3614 |
| 2019/0034716 A1 | 1/2019 | Kamarol et al. |
| 2019/0174048 A1* | 6/2019 | Dorai ..................... H05B 45/39 |
| 2019/0206355 A1* | 7/2019 | Morii ................... G09G 3/3677 |
| 2021/0021843 A1 | 1/2021 | Kim et al. |

FOREIGN PATENT DOCUMENTS

| | | |
|---|---|---|
| CN | 103873805 A | 6/2014 |
| CN | 104637466 A | 5/2015 |
| CN | 107393501 A | 11/2017 |
| JP | H07336636 | 12/1995 |
| JP | H10340077 | 12/1998 |
| KR | 10-0702742 | 4/2007 |
| KR | 10-0752652 | 8/2007 |
| KR | 10-2013-0033096 | 4/2013 |
| KR | 10-2015-0055324 | 5/2015 |
| KR | 10-2015-0093548 | 8/2015 |
| KR | 10-2016-0012022 | 2/2016 |
| KR | 10-2017-0008698 | 1/2017 |
| KR | 10-2017-0105213 | 9/2017 |

* cited by examiner

DISPLAY DRIVER CIRCUIT SUPPORTING OPERATION IN A LOW POWER MODE OF A DISPLAY DEVICE

CROSS-REFERENCE TO RELATED APPLICATION

This application claims priority under 35 U.S.C. § 119 to Korean Patent Application No. 10-2018-0033421, filed on Mar. 22, 2018, in the Korean Intellectual Property Office, and claims priority and benefit of U.S. patent application Ser. No. 17/060,127 filed on Oct. 1, 2020, and U.S. patent application Ser. No. 16/150,365 filed on Oct. 3, 2018, the disclosures of which are incorporated by reference herein in their entirety.

TECHNICAL FIELD

Exemplary embodiments of the inventive concept relate to an electronic circuit, and more particularly, to a configuration and an operation of a display driver circuit configured to drive and control an operation of a display device.

DISCUSSION OF RELATED ART

Most electronic devices include a display device. The electronic device may provide a user with an image through the display device. The display device may be implemented in various forms such as a liquid crystal display (LCD), a light emitting diode (LED) display, an organic LED (OLED) display, or an active matrix OLED (AMOLED) display.

The use of small-sized electronic devices is increasing as IT technologies develop. Examples of small-sized electronic devices include smartphones, tablet personal computers (PC), portable multimedia players (PMP), laptop PCs, wearable devices, and/or the like.

Since most small-sized electronic device operate using power from a battery, it is important to reduce power consumption, e.g., power consumption of a display device included in the small-sized electronic device.

SUMMARY

According to an exemplary embodiment of the inventive concept, a display driver circuit configured to drive a display panel may include a memory, a decoder, and a controller. The memory may store first data using data from outside of the display driver circuit. The decoder may decode the stored first data. The controller may generate compression data using the decoded first data. While an image based on the decoded first data is displayed on the display panel, when second data based on the data from the outside are not stored in the memory after the first data are stored in the memory, the controller may control the decoder such that the decoder does not operate and controls the memory such that the compression data are stored in the memory.

According to an exemplary embodiment of the inventive concept, a display driver circuit configured to drive a display panel may include a memory, a decoder, and a controller. The memory may store first data from outside of the display driver circuit. The decoder may decode the stored first data. The controller may control the memory and the decoder using the first data from the outside. When a size of the first data from the outside corresponds to a size of compression data, the controller may control the decoder such that the decoder does not operate and to control the memory such that an image is displayed on the display panel using the stored first data without the compression data.

According to an exemplary embodiment of the inventive concept, a display driver circuit configured to drive a display panel may include an encoder, a memory, a decoder, and a controller. The encoder may encode first data of a first type. The memory may store second data of a second type, third data of a third type, and the encoded first data. The decoder may decode the encoded first data and the second data stored in the memory. The controller may receive the first data, the second data, and the third data from outside. When the controller receives the second data, the controller may control the encoder such that the encoder does not operate. When the controller receives the third data, the controller may control the encoder and the decoder such that the encoder and the decoder do not operate.

BRIEF DESCRIPTION OF THE FIGURES

The above and other features will become apparent by describing in detail exemplary embodiments thereof with reference to the accompanying drawings.

DETAILED DESCRIPTION OF THE EMBODIMENTS

Figure 1:
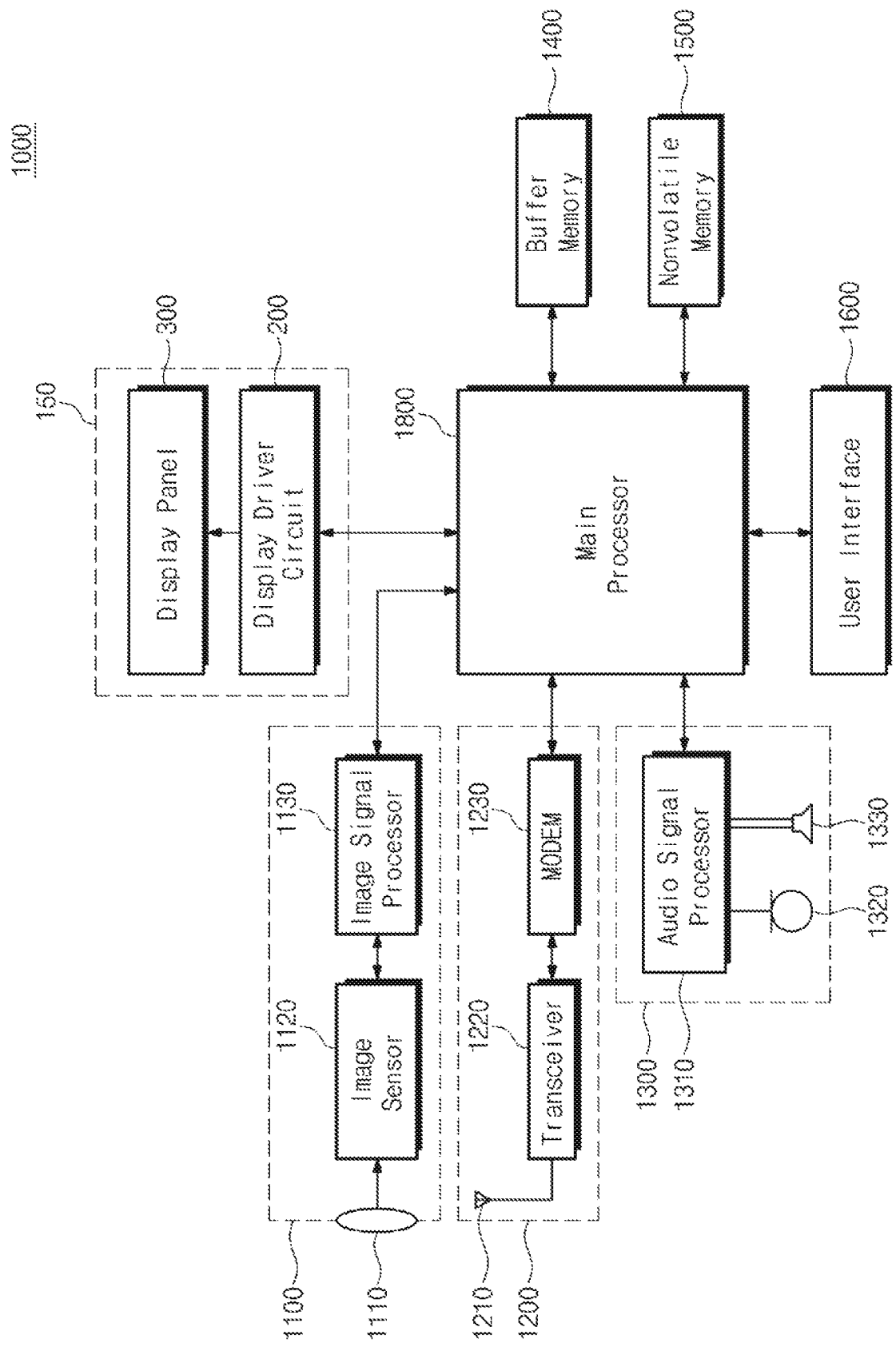
FIG. 1 is a block diagram illustrating a configuration of an electronic device including a display driver circuit according to an exemplary embodiment of the inventive concept.

Exemplary embodiments of the inventive concept provide a display driver circuit supporting an operation in a low power mode of a display device.

Exemplary embodiments of the inventive concept will be described in detail hereinafter with reference to the accompanying drawings. Like reference numerals may refer to like elements throughout this application.

FIG. 1 is a block diagram illustrating a configuration of an electronic device including a display driver circuit according to an exemplary embodiment of the inventive concept. For example, an electronic device 1000 may be implemented with one of various types of electronic devices such as a smartphone, a tablet PC, a laptop PC, an e-book reader, an MP3 player, a wearable device, etc.

The electronic device 1000 may include various electronic circuits. For example, the electronic circuits of the electronic device 1000 may include a display device 150, an image processing block 1100, a communication block 1200, an audio processing block 1300, a buffer memory 1400, a nonvolatile memory 1500, a user interface 1600, and a main processor 1800.

The display device 150 may receive data from an external device (e.g., the main processor 1800). A display driver circuit 200 included in the display device 150 may display an image in a display panel 300 based on the received data. Example configurations and operations of the external device, the display driver circuit 200, and the display panel 300 will be described with reference to FIG. 2. In addition, example configurations and operations of the display device 150 will be described with reference to FIGS. 3 to 15.

The image processing block 1100 may receive light through a lens 1110. An image sensor 1120 and an image signal processor 1130 included in the image processing block 1100 may generate image data associated with an external subject, based on the received light.

The communication block 1200 may exchange signals with an external device/system through an antenna 1210. A transceiver 1220 and a MODEM (Modulator/Demodulator) 1230 of the communication block 1200 may process signals exchanged with the external device/system in compliance with various wireless communication protocols.

The audio processing block 1300 may process sound information by using an audio signal processor 1310, thus playing and outputting audio. The audio processing block 1300 may receive an audio input through a microphone 1320. The audio processing block 1300 may output the played audio through a speaker 1330.

The buffer memory 1400 may store data that are used in operation of the electronic device 1000. For example, the buffer memory 1400 may temporarily store data processed or to be processed by the main processor 1800. For example, the buffer memory 1400 may include a volatile memory such as a static random access memory (SRAM), a dynamic RAM (DRAM), or a synchronous DRAM (SDRAM), and/or a nonvolatile memory such as a phase-change RAM (PRAM), a magneto-resistive RAM (MRAM), a resistive RAM (ReRAM), or a ferroelectric RAM (FRAM).

The nonvolatile memory 1500 may store data regardless of power supply. For example, the nonvolatile memory 1500 may include at least one of various nonvolatile memories such as a flash memory, a PRAM, an MRAM, a ReRAM, and a FRAM. For example, the nonvolatile memory 1500 may include a removable memory such as a secure digital (SD) card, and/or an embedded memory such as an embedded multimedia card (eMMC).

The user interface 1600 may arbitrate communication between a user and the electronic device 1000. For example, the user interface 1600 may include input interfaces such as a keypad, a button, a touch screen, a touch pad, a gyroscope sensor, a vibration sensor, or an acceleration sensor. For example, the user interface 1600 may include output interfaces such as a motor or an LED lamp.

The main processor 1800 may control overall operations of the components of the electronic device 1000. The main processor 1800 may process various operations of the electronic device 1000. For example, the main processor 1800 may be implemented with an operation processing device/circuit, which includes one or more processor cores, such as a general-purpose processor, a special-purpose processor, an application processor, or a microprocessor.

For example, the main processor 1800 may transmit data to the display driver circuit 200. The display driver circuit 200 may drive the display panel 300 based on the data to display an image in the display panel 300.

As another example, the user may set an operation mode of the display device 150 through the user interface 1600. The main processor 1800 may control a type of data to be transmitted to the display driver circuit 200 or a speed of data to be transmitted to the display driver circuit 200, depending on the operation mode set by the user. The display driver circuit 200 may control a path where data are processed, depending on the type of the received data or the speed of the received data.

However, the components illustrated in FIG. 1 are only exemplary, and are not intended to limit the inventive concept. The electronic device 1000 may not include one or more of the components illustrated in FIG. 1, or may further include at least one component not illustrated in FIG. 1.

Figure 2:
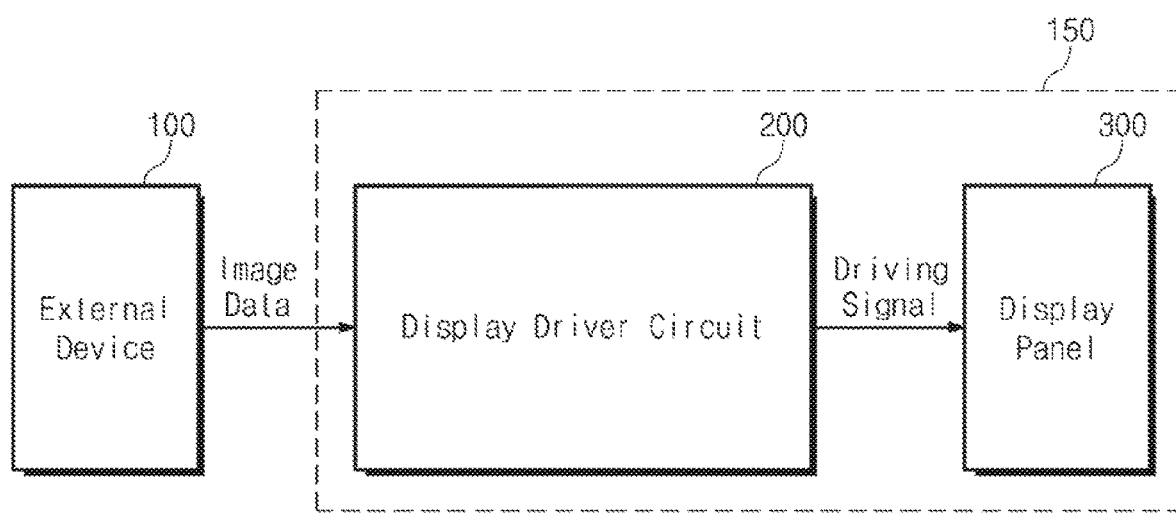
FIG. 2 is a block diagram illustrating a configuration associated with a display device of FIG. 1 according to an exemplary embodiment of the inventive concept.

FIG. 2 is a block diagram illustrating a configuration associated with a display device of FIG. 1 according to an exemplary embodiment of the inventive concept.

The display device 150 may include the display driver circuit 200 and the display panel 300. However, FIG. 2 shows only a configuration of the display device 150, and the display device 150 may further include components not illustrated in FIG. 2.

An external device 100 may transmit data to the display device 150. For example, the external device 100 may include the main processor 1800 of FIG. 1. The external device 100 may communicate with the display device 150 in compliance with an interface protocol (e.g., a mobile industry processor interface (MIPI) protocol) supported by the electronic device 1000.

The display device 150 may display an image based on the data. Data transmitted from the external device 100 may include at least one of still image data and video data (or moving image data). The external device 100 may transmit data at various speeds. For example, the external device 100 may transmit still image data at a speed which is slower than a speed at which video data are transmitted.

The external device 100 may transmit various types of data. For example, the external device 100 may transmit image data having various sizes such as M bits, N bits, and K bits. "M", "N", and "K" may be positive integers.

For example, when an encoder is not included in the external device 100, the external device 100 may transmit full color data which are not encoded. The full color data may include information about a color of an image to be displayed in a display panel. The full color data may be M-bit data.

As another example, when an encoder is included in the external device 100, the external device 100 may transmit encoded data. The encoder may encode the full color data to the encoded data. The encoded data may be N-bit data. In this case, "N" may be smaller than "M".

As another example, when a compression processor is included in the external device 100, the external device 100 may transmit compressed data. The compression processor may generate the compressed data by processing the full color data. The compressed data may be K-bit data. "K" may be smaller than "M" and "N". An operation in which the compressed data are generated by processing the full color data will be described with reference to FIG. 4.

Since the size of the encoded data and the size of the compressed data are smaller than the size of the full color data, power consumption when the external device 100 transmits the encoded data or the compressed data may be smaller than power consumption when the external device 100 transmits the full color data. In exemplary embodiments of the inventive concept, to reduce power consumption of the display driver circuit 200, the external device 100 may transmit the encoded data or the compressed data.

The display driver circuit 200 may receive data from the external device 100. To display an image in the display device 150, the display driver circuit 200 may output a driving signal based on the received data.

The display driver circuit 200 may receive data at various speeds. For example, the external device 100 may transmit still image data and video data at different speeds. In an exemplary embodiment of the inventive concept, the display driver circuit 200 may control a path where data are processed, depending on a speed at which data are received.

The display driver circuit 200 may receive various types of data. For example, the display driver circuit 200 may receive the full color data, the encoded data, the compressed data, and/or the like from the external device 100. The data may include information about a type of the data. In an exemplary embodiment of the inventive concept, the display driver circuit 200 may control a path where data are processed depending on the type of the received data, by using the information about the type of the data.

To control a path where data are processed, the display driver circuit 200 may control some of components of the display driver circuit 200 such that some of the components of the display driver circuit 200 do not operate. Accordingly, the power consumption of the display driver circuit 200 may be reduced.

The display panel 300 may display an image which is based on data received by the display driver circuit 200. For example, the display panel 300 may be implemented in various forms such as a crystal display (LCD) panel, a light-emitting diode (LED) display panel, an organic LED (OLED) display panel, or an active matrix OLED (AMO-LED) display panel.

The display panel 300 may include a pixel array which is composed of a plurality of pixels. The pixel array may form a region which is used as a screen where an image is displayed. Pixels of the pixel array may be independently driven by the display driver circuit 200. The display driver circuit 200 may drive the display panel 300 based on the driving signal.

The user may set an operation mode of the display device 150 through the user interface 1600 of FIG. 1. The display device 150 may be operated in various modes by the display driver circuit 200. In an exemplary embodiment of the inventive concept, the display driver circuit 200 may support the display device 150 to operate in a low-power mode. The low-power mode may refer to a mode which limits a part of functions of the display device 150 to reduce power consumption of the display device 150.

In an exemplary embodiment of the inventive concept, the low-power mode may refer to a mode of displaying a simple image in the display panel 300. An image may be displayed on the display panel 300 in the low-power mode by using a combination of colors less than colors used to display an image on the display panel 300 in a normal mode.

In an exemplary embodiment of the inventive concept, the low-power mode may be an always on display (AOD) mode. The AOD mode may be a mode which displays a specific image on the display panel 300 without a continuous manipulation of the user. For example, in the AOD mode, the display driver circuit 200 may display time information on a given region of the display panel 300 and may display a black color in a remaining region. While the time information displayed on the display panel 300 does not change, the display driver circuit 200 may not receive new data from the external device 100.

For example, the display driver circuit 200 may operate in such a way that an image is displayed in a combination of not more than eight colors. Additionally, while an image is displayed on the display panel 300 and the displayed image does not change, the display driver circuit 200 may operate without receiving data from the external device 100. Configurations and operations of the display driver circuit 200 will be described with reference to FIGS. 3 to 15.

Figure 3:
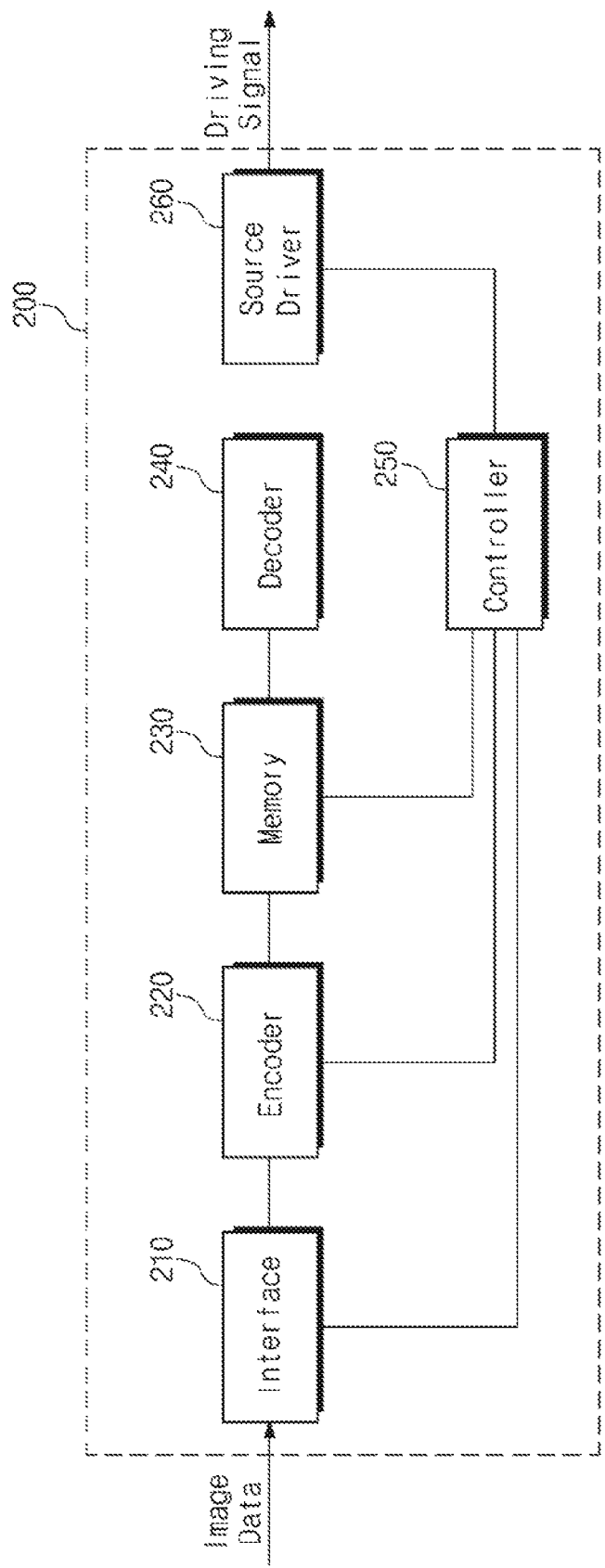
FIG. 3 is a block diagram illustrating a configuration of a display driver circuit of FIG. 2 according to an exemplary embodiment of the inventive concept.

FIG. 3 is a block diagram illustrating a configuration of a display driver circuit of FIG. 2 according to an exemplary embodiment of the inventive concept.

The display driver circuit 200 may include an interface 210, an encoder 220, a memory 230, a decoder 240, a controller 250, and a source driver 260. However, FIG. 3 shows only a configuration of the display driver circuit 200, and the display driver circuit 200 may further include components not illustrated in FIG. 3. Alternatively, the display driver circuit 200 may not include one or more of the interface 210, the encoder 220, the memory 230, the decoder 240, the controller 250, and the source driver 260 illustrated in FIG. 3. For example, when the display driver circuit 200 receives the encoded data or compressed data from the external device 100, the display driver circuit 200 may not include the encoder 220. Configurations and operations of the display driver circuit 200 which does not include an encoder will be described with reference to FIGS. 9 to 14.

The external device 100 may transmit a transmit signal for transmitting data. The interface 210 may receive the transmit signal from the external device 100. The interface 210 may receive image data from the external device 100, based on the transmit signal. For example, the image data may include information about an image to be displayed on the display panel 300. The interface 210 may transmit the received data to any of the other components in the display driver circuit 200.

The interface 210 may receive still image data or video data. The interface 210 may receive data at a speed corresponding to a speed at which the external device 100 transmits data.

The interface 210 may receive the still image data and the video data at different speeds. In an exemplary embodiment of the inventive concept, the interface 210 may receive the still image data at a speed which is slower than a speed at which the video data are transmitted.

The interface 210 may receive various types of data from the external device 100. For example, the received data may correspond to full color data, encoded data, compressed data, etc. The size of the full color data may be M bits, the size of the encoded data may be N bits, and the size of the compressed data may be K bits. "K" may be smaller than "N", and "N" may be smaller than "M".

The encoder 220 may receive data from the interface 210. The encoder 220 may encode the received data. For example, the full color data may be encoded from M-bit data to N-bit data.

The memory 230 may store data transmitted from the components of the display driver circuit 200. The memory 230 may include a volatile and/or nonvolatile memory. For example, the memory 230 may include at least one of a volatile memory (DRAM, SRAM, or SDRAM) and a nonvolatile memory (programmable read-only memory (PROM), erasable PROM (EPROM), flash ROM, or flash memory).

For example, the memory 230 may receive data from the interface 210 or the encoder 220. The memory 230 may store data received from the interface 210 or data received from the encoder 220. When the full color data are received from the external device 100, the full color data may be encoded before the full color data are stored in the memory 230. Accordingly, a capacity of the memory 230 may be reduced.

The decoder 240 may decode the encoded data. To decode data, the decoder 240 may receive the encoded data stored in the memory 230.

For example, when the display driver circuit 200 receives the encoded data, the display driver circuit 200 may include the decoder 240 for decoding the encoded data. In an exemplary embodiment of the inventive concept, when the display driver circuit 200 includes an encoder for compressing data, the display driver circuit 200 may include the decoder 240 corresponding to a compression format of the encoder 220. The encoded data may be decoded by the decoder 240.

For example, the size of the full color data may be larger than the size of encoded data. When the full color data are used in the display driver circuit 200, power consumption of the display driver circuit 200 may increase. Additionally, a storage space of the memory 230 may become insufficient. Accordingly, when the full color data are received from the external device 100, the full color data may be transmitted or received among components of the display driver circuit 200 in an encoded state.

The controller 250 may receive data from the external device 100. Additionally, the controller 250 may receive data stored in the memory 230 or data decoded by the decoder 240. The controller 250 may process the decoded data to generate compression data or may use data stored in the memory 230 as compression data.

The compression data may be used to display a simple image in the low-power mode. The size of the compression data may be smaller than the size of the encoded data. When the compression data are used, power consumption of the display driver circuit 200 may be reduced. Additionally, a storage space of the memory 230 may be efficiently used.

The controller 250 may generate color data by using the compression data. The color data may include information about a color of an image to be displayed on the display panel 300 in the low-power mode. Kinds of colors capable of being expressed by using information included in the color data may be smaller in number than kinds of colors capable of being expressed by using information included in the full color data. Colors expressed by the color data may be based on colors expressed by the full color data. A method of generating the full color data, the compression data, and the color data in the controller 250 will be described with reference to FIG. 4.

The above descriptions include a configuration and an operation in which the controller 250 generates the color data by using the compression data, but the inventive concept is not limited thereto. For example, the controller 250 may transmit the compression data to a separate image processing module, instead of generating the color data by using the compression data. The image processing module may generate the color data by using the received compression data.

Data received from the external device 100 may include information about a type of the data. By using the information included in the data, the controller 250 may operate based on the type of the data received from the external device 100. The controller 250 may control a path in which the data are processed in the display driver circuit 200, depending on the type of the data received from the external device 100. To control the path where the data are processed, the controller 250 may control the encoder 220, the memory 230, and the decoder 240. Depending on the type of the data received by the display driver circuit 200, the controller 250 may control the encoder 220 and/or the decoder 240 such that the encoder 220 and/or the decoder 240 do not operate. Power consumption of the display driver circuit 200 when the encoder 220 and/or the decoder 240 does not operate is smaller than power consumption of the display driver circuit 200 when the encoder 220 and/or the decoder 240 operates. Accordingly, the power consumption of the display driver circuit 200 may be reduced.

In an exemplary embodiment of the inventive concept, when the received data are compressed data, the controller 250 may control the encoder 220 and the decoder 240 such that the encoder 220 and the decoder 240 do not operate. In an exemplary embodiment of the inventive concept, when the received data are encoded data, the controller 250 may control the encoder 220 such that the encoder 220 does not operate. An operation of the controller 250, which is performed according to a type of received data, will be described with reference to FIGS. 6 and 15.

The controller 250 may generate a control signal. The components 210, 220, 230, 240, 250, and 260 of the display driver circuit 200 may operate in response to the control signal. For example, the components 210, 220, 230, 240, 250, and 260 of the display driver circuit 200 may operate in response to the control signal such that an image is displayed on the display panel 300.

The controller 250 may operate based on a speed at which data are received from the external device 100. The speed at which data are received may be determined based on a speed at which the control signal is generated.

For example, while an image is displayed on the display panel 300, when data are received from the external device 100 at a slower speed than a speed at which the control signal is generated, the controller 250 may control the memory 230 such that compression data are stored in the memory 230. When the compression data are stored in the memory 230, the controller 250 may control the encoder 220 and the decoder 240 such that the encoder 220 and the decoder 240 do not operate. While new data are not received from the external device 100, the controller 250 may generate color data by using the compression data stored in the memory 230. An operation of the controller 250, which is performed according to a speed at which data are received from the external device 100, will be described with reference to FIGS. 6 and 15.

The source driver 260 may receive the color data generated in the controller 250. The source driver 260 may output the driving signal based on the color data. The source driver 260 may drive data lines connected to the pixels of the display panel 300. The source driver 260 may drive the data lines based on the driving signal. The source driver 260 may receive the color data in response to the control signal and may control the display panel 300 such that an image is displayed on the display panel 300.

Figure 4:
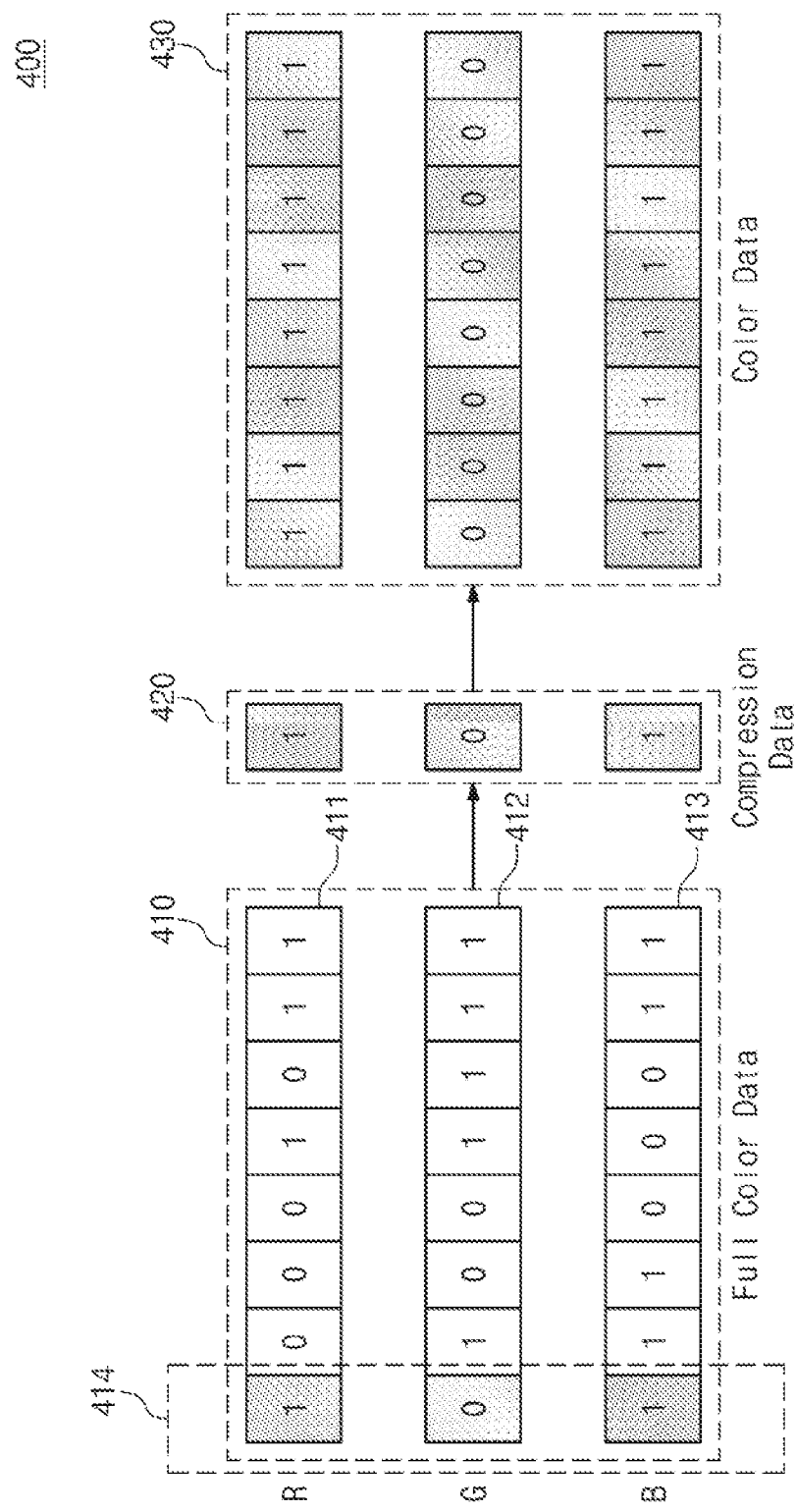
FIG. 4 is a conceptual diagram for describing a method of processing full color data to generate compression data and color data in a controller of FIG. 3 according to an exemplary embodiment of the inventive concept.

FIG. 4 is a conceptual diagram for describing a method of processing full color data to generate compression data and color data in a controller of FIG. 3 according to an exemplary embodiment of the inventive concept.

The display device 150 may be operated in the low-power mode by the display driver circuit 200. An image may be displayed on the display panel 300 in the low-power mode by using a combination of colors less than colors used to display an image on the display panel 300 in the normal mode, For example, in the low-power mode, an image may be displayed on the display panel 300 by using a combination of not more than eight colors.

A description will be given where the display device 150 displays an image in the low-power mode by using a combination of not more than eight colors, but the inventive concept is not limited thereto. The display device 150 according to exemplary embodiments of the inventive concept may display an image by using a combination of two colors (black and white) in the low-power mode, or may display an image by using a combination of more than eight colors.

The controller 250 may receive decoded data from the decoder 240. For example, the decoded data may be the full color data.

Referring to drawing 410, the full color data may be composed of color streams 411, 412, and 413 of red "R", green "G", and blue "B", respectively. Each of the color streams 411, 412, and 413 may be composed of eight bits. Accordingly, information about 256 colors may be stored in only the one red color stream 411. Since an image may be displayed on the display panel 300 by using a combination of not more than eight colors in the low-power mode, not all eight bits in each of the color streams 411, 412, and 413 may be needed.

The controller 250 may generate compression data by using bit values of the color streams 411, 412, and 413. Bits included in the compression data may be selected from bits included in the color streams 411, 412, and 413. Referring to drawing 414 and drawing 420, the controller 250 may generate the compression data by using most significant bit (MSB) values of the color streams 411, 412, and 413. Since the full color data include three color streams, the compression data may be composed of three bits.

However, the inventive concept is not limited thereto. For example, the full color data may include "x" color streams, and one color stream may be composed of "y" bits. The compression data may be generated by using "z" bits of the "y" bits in each color stream. Here, "x", "y", and "z" may be any integer, and "z" may be smaller than "y".

The controller 250 may generate color data by using bit values of the compression data. The controller 250 may generate the color data by enumerating all or some of the bit values of the compression data. Referring to drawing 420 and drawing 430, the color data may be generated by enumerating bits of the compression data eight times. A size of the color data may be identical to a size of the full color data. However, information about a color capable of being expressed by using the color data may be smaller in size than information about a color capable of being expressed by using the full color data.

For example, the full color data may express 256 colors by using one color stream. Since three color streams are included in the full color data, the full color data may express "256*256*256" colors. In contrast, the color data may express 2 colors by using one color stream. The color data may express "2*2*2" colors by using three color streams.

A method of processing the full color data to generate compressed data in a compression processor included in the external device 100 may be identical or similar to a method of processing the full color data to generate the compression data in the controller 250. Thus, the compressed data and the compression data which are generated based on the same full color data may include the same information.

Accordingly, when data received from the external device 100 are compressed data, the controller 250 may not generate separate compression data and may use the compressed data as the compression data.

Figure 5:
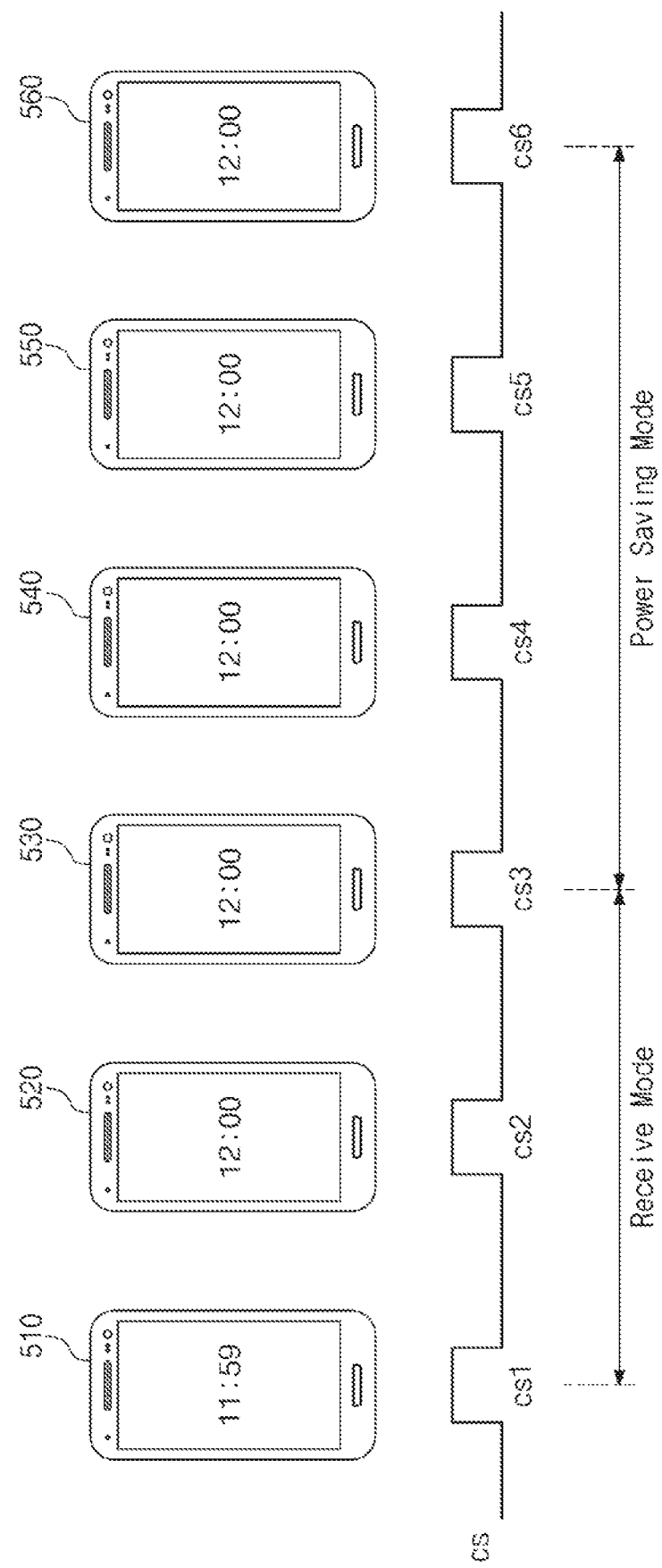
FIG. 5 is a conceptual diagram for describing a receive mode and a power saving mode of a display driver circuit according to an exemplary embodiment of the inventive concept.

FIG. 5 is a conceptual diagram for describing a receive mode and a power saving mode of a display driver circuit according to an exemplary embodiment of the inventive concept.

For example, in the low-power mode in which an image is displayed by using a combination of not more than eight colors, the display driver circuit 200 may operate in a receive mode or in a power saving mode depending on a speed at which data are received.

In FIG. 5, an example waveform of a control signal cs is illustrated. The control signal cs may be generated by the controller 250. The display driver circuit 200 may operate in response to the control signal cs. For example, the display driver circuit 200 may receive data from the external device 100 in response to the control signal cs. As another example, the display driver circuit 200 may operate in response to the control signal cs such that an image is displayed on the display panel 300. The receive mode and the power saving mode will be described with regard to the control signal cs.

In the receive mode, the display driver circuit 200 may receive data from the external device 100 at a speed corresponding to a speed at which the control signal cs is generated. For example, the speed at which data are received from the external device 100 may be substantially identical to the speed at which the control signal cs is generated.

The display driver circuit 200 may receive first data in response to a signal cs1. A first image 510 may be displayed based on the first data. The display driver circuit 200 may receive second data in response to a signal cs2. A second image 520 may be displayed based on the second data.

Third data for displaying a third image 530 may not be transmitted from the external device 100. When the third data are not received in response to a signal cs3, the display driver circuit 200 may use the second data to display the third image 530. After the third image 530 is displayed based on the second data, the display driver circuit 200 may operate in the power saving mode.

In the power saving mode, while an image is displayed on the display panel 300, the display driver circuit 200 may not receive data from the external device 100. While data are not received from the external device 100, the display driver circuit 200 may operate such that an image is displayed by using the data received in the receive mode. For example, until a signal cs6 is generated after the signal cs3 is generated, the display driver circuit 200 may not receive data from the external device 100. A fourth image 540, a fifth image 550, and a sixth image 560 may be displayed based on the second data.

After the signal cs6 is generated, when data are received from the external device 100, the display driver circuit 200 may operate in the receive mode.

For example, the controller 250 may generate the signals cs1 to cs6 every reference time interval, and a reference time may be provided between the signals cs1 to cs6. For example, when following (or subsequent) data are received within the reference time after preceding data are received (e.g., in the case where a speed at which data are received is fast), the display driver circuit 200 may operate in the receive mode. In contrast, when the following data are not received within the reference time after the preceding data are received (e.g., in the case where a speed of receiving data is slow), the display driver circuit 200 may operate in the power saving mode.

Figure 6:
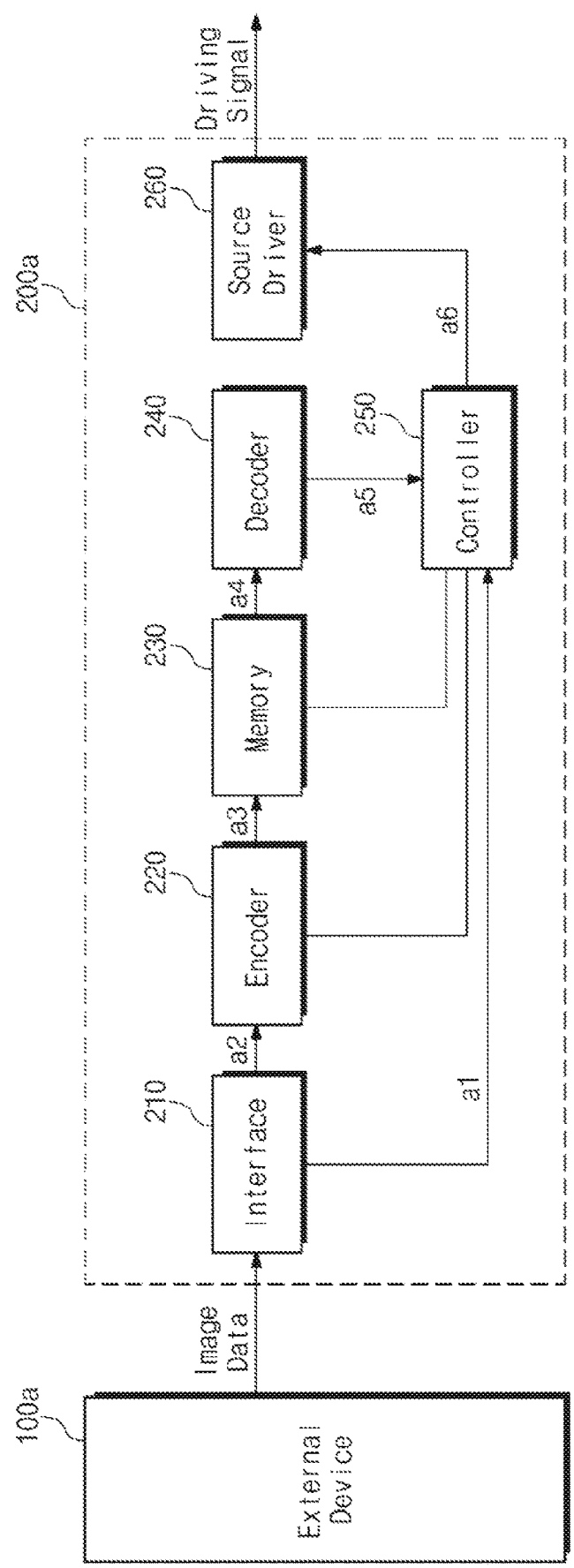
FIG. 6 is a conceptual diagram for describing an operation of a display driver circuit in a receive mode for receiving full color data from an external device according to an exemplary embodiment of the inventive concept.

FIG. 6 is a conceptual diagram for describing an operation of a display driver circuit in a receive mode for receiving full color data from an external device according to an exemplary embodiment of the inventive concept. For better understanding, FIG. 5 will be referenced together with FIG. 6.

In the descriptions with reference to FIGS. 6 to 8, an operation of an external device 100a may be identical or similar to the operation of the external device 100 described with reference to FIG. 2. Components of a display driver circuit 200a may operate to be identical or similar to the components 210, 220, 230, 240, 250, and 260 of the display driver circuit 200 of FIG. 3.

Figure 7:
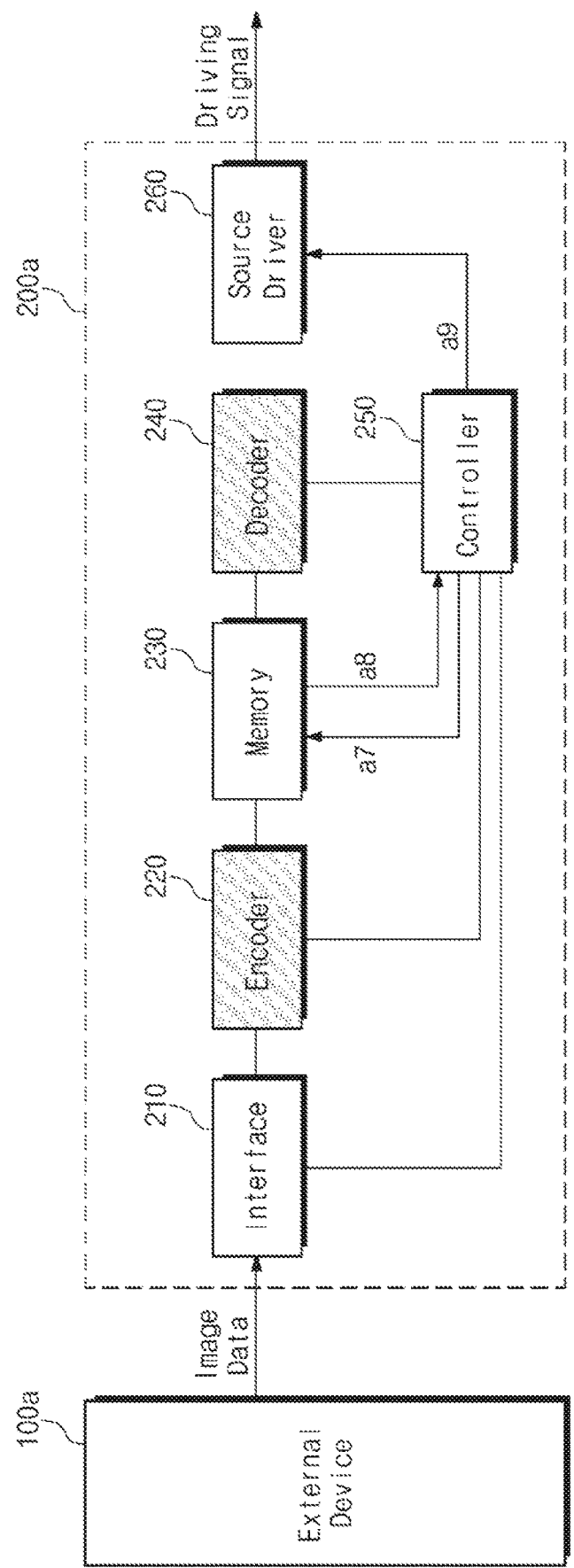
FIG. 7 is a block diagram for describing an operation of processing data in a power saving mode after full color data are received from an external device according to an exemplary embodiment of the inventive concept.
Figure 8:
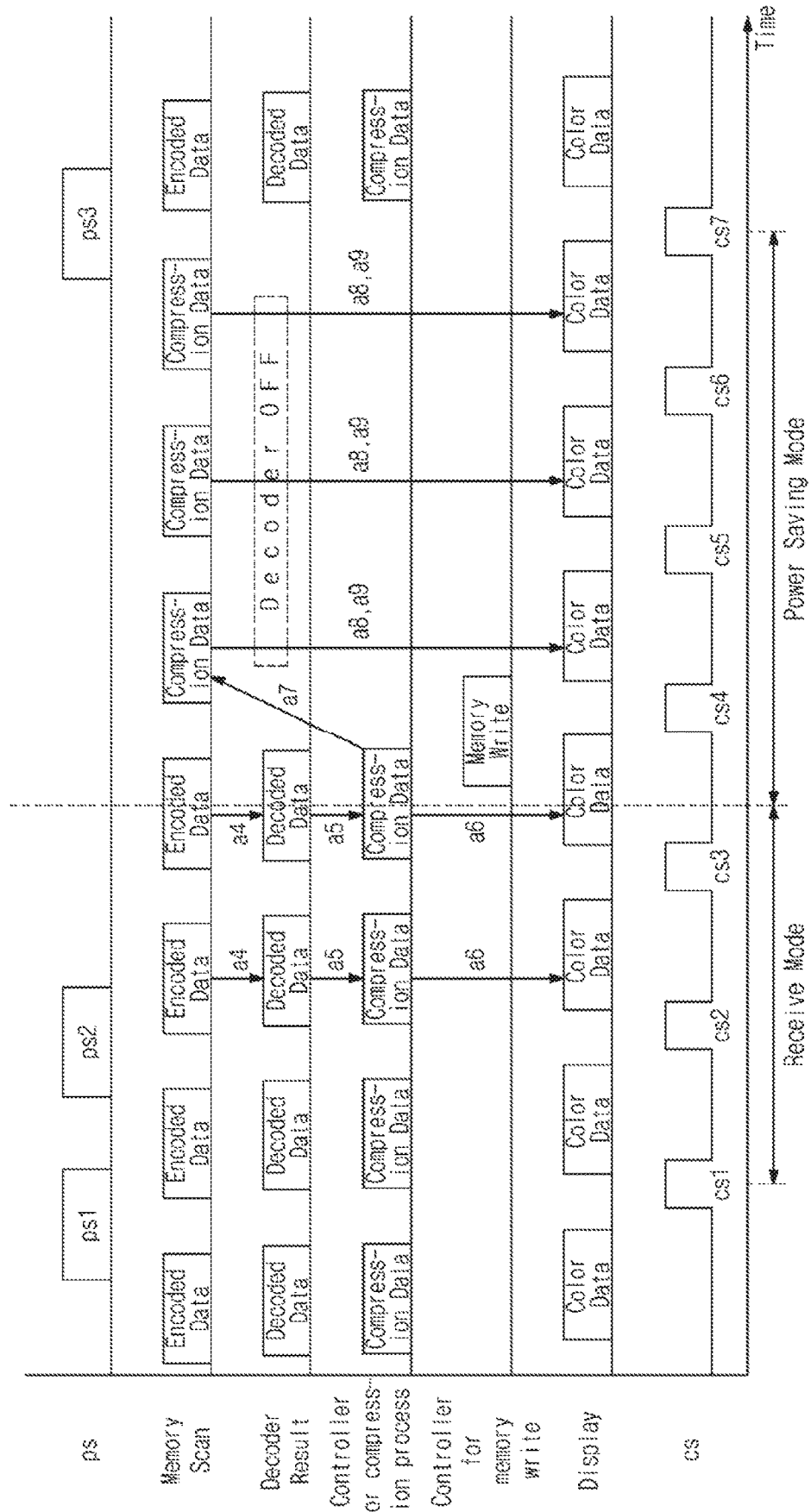
FIG. 8 is a timing diagram for describing an operation of a controller in the receive mode of FIG. 6 and in the power saving mode of FIG. 7 according to an exemplary embodiment of the inventive concept.

In the descriptions with reference to FIGS. 6 to 8, the second data received from the external device 100a may be the full color data. The full color data may be M-bit data. However, the inventive concept is not limited to the case where the second data are the full color data.

The interface 210 may receive the second data from the external device 100a.

In operation "a1", the interface 210 may transmit the second data received from the external device 100a to the controller 250. The controller 250 may control operations of the encoder 220 and the decoder 240, depending on a type of the second data received. When the second data are the full color data, the controller 250 may control the encoder 220 and the decoder 240 such that the encoder 220 and the decoder 240 operate.

In operation "a2", the interface 210 may transmit the full color data to the encoder 220. The encoder 220 may encode the full color data. The encoded data may be N-bit data.

In operation "a3", the memory 230 may store the data encoded by the encoder 220.

In operation "a4", the decoder 240 may decode the data stored in the memory 230. The decoded data may be the full color data.

In operation "a5", depending on the method described with reference to FIG. 4, the controller 250 may generate compression data by using the full color data. The compression data may be K-bit data. Additionally, the controller 250 may generate color data by using the compression data. The color data may be M-bit data.

In operation "a6", the controller 250 may output the color data to the source driver 260. The source driver 260 may receive the color data in response to the signal cs2. The source driver 260 may output the driving signal based on the color data. Depending on the driving signal, the source driver 260 may control the display panel 300 such that the second image 520 is displayed on the display panel 300.

When the third data are not received in response to the signal cs3, the data stored in the memory 230 in operation "a3" may be again used to display the third image 530. The display driver circuit 200a may display the third image 530 in the display panel 300 by repeating some of the operations performed to display the second image 520 in the display panel 300. The third image 530 may be displayed on the display panel 300 through operation "a4" to operation "a6".

FIG. 7 is a block diagram for describing an operation of processing data in a power saving mode after full color data are received from an external device according to an exemplary embodiment of the inventive concept. For better understanding, FIG. 5 will be referenced together with FIG. 7.

After the third image 530 is displayed, the controller 250 may operate in the power saving mode. In the power saving mode, the controller 250 may control the encoder 220 and the decoder 240 such that the encoder 220 and the decoder 240 do not operate.

In operation "a7", the controller 250 may control the memory 230 such that the compression data generated in the receive mode are stored in the memory 230. The compression data may be stored in the memory 230. The compression data stored in the memory 230 may be K-bit data.

In operation "a8", the controller 250 may use the compression data stored in the memory 230 to display the fourth image 540 in response to the signal cs4. Depending on the method described with reference to FIG. 4, the controller 250 may generate the color data by using the compression data.

When the compression data have been stored in the memory 230, the controller 250 may process the compression data stored in the memory 230 without intervention of the decoder 240 and may generate the color data. When an image is displayed on the display panel 300 based on the color data, the decoder 240 may not operate. Accordingly, the power consumption of the display driver circuit 200a may be reduced. However, kinds of colors capable of being expressed based on the color data may be smaller in number than kinds of colors capable of being expressed based on the full color data.

In operation "a9", the controller 250 may output the color data to the source driver 260. The color data generated in operation "a8" may include the same information as the color data generated in operation "a5". Accordingly, the fourth image 540 may be displayed identically to the second image 520.

In operation "a7", the compression data stored in the memory 230 may be used to display the fifth image 550 and the sixth image 560 in response to the signals cs5 and cs6, respectively. The display driver circuit 200a may display the fifth image 550 and the sixth image 560 in the display panel 300 by repeating some of the operations performed to display the fourth image 540 in the display panel 300. The fifth image 550 and the sixth image 560 may be displayed one by one in the display panel 300 whenever operation "a8" and operation "a9" are repeated.

FIG. 8 is a timing diagram for describing an operation of a controller in the receive mode of FIG. 6 and in the power saving mode of FIG. 7 according to an exemplary embodiment of the inventive concept. For better understanding, FIGS. 6 and 7 will be referenced together with FIG. 8.

When data are transmitted from the external device 100a to the interface 210, the external device 100a may transmit a transmit signal ps. For example, when transmit signals ps1, ps2, and ps3 are received, the interface 210 may receive the first data, the second data, and the third data, respectively. Accordingly, when the transmit signals ps1 and ps2 are received, the display driver circuit 200a may operate in the receive mode. The display driver circuit 200a may operate in the power saving mode from a time when the transmit signal ps2 is received to a time when the transmit signal ps3 is received.

Depending on a speed at which data are received, the display driver circuit 200a may repeat an operation in the power saving mode and an operation in the receive mode. For example, when the transmit signal ps3 is received, the display driver circuit 200a may again operate in the receive mode. Additionally, when a new transmit signal is not received during the reference time after the transmit signal ps3 is received, the display driver circuit 200a may again operate in the power saving mode.

The controller 250 may operate in response to the control signal cs based on a speed at which data are received from the external device 100a.

In the receive mode, the display driver circuit 200a may perform operation "a1" to operation "a6" in response to the signal cs2. When the second data are received, the second image 520 may be displayed on the display panel 300 through operation "a1" to operation "a6". As in the above description, when the first data are received, the first image 510 may be displayed on the display panel 300 through operation "a1" to operation "a6".

When new data in response to the signal cs3 are not received from the external device 100a, the display driver circuit 200a may perform operation "a4" to operation "a6" in response to the signal cs3. In this case, since the second data stored in the memory 230 are used, operation "a1" to operation "a3" may be omitted. The third image 530 which is based on the second data may be displayed on the display panel 300 through operation "a4" to operation "a6".

After the third image 530 is displayed, the controller 250 may operate in the power saving mode. In the power saving mode, the controller 250 may control the encoder 220 and the decoder 240 such that the encoder 220 and the decoder 240 do not operate. Since the compression data generated in operation "a5" are used in the power saving mode, the encoder 220 and the decoder 240 may not operate.

In the power saving mode, the controller 250 may control the memory 230 in response to the signal cs4 such that the compression data generated in operation "a5" are stored in the memory 230. In operation "a7", the compression data generated in operation "a5" may be stored in the memory 230 under control of the controller 250. The controller 250 may perform operation "a8" and operation "a9" by using the compression data stored in the memory 230. Through operation "a7" to operation "a9", the fourth image 540 may be displayed based on the second data.

In the power saving mode, the controller 250 may repeat operation "a8" and operation "a9" in response to the signals cs5 and cs6. The controller 250 may repeat operation "a8" and operation "a9" in response to the control signal cs, until new data are received from the external device 100a.

Figure 9:
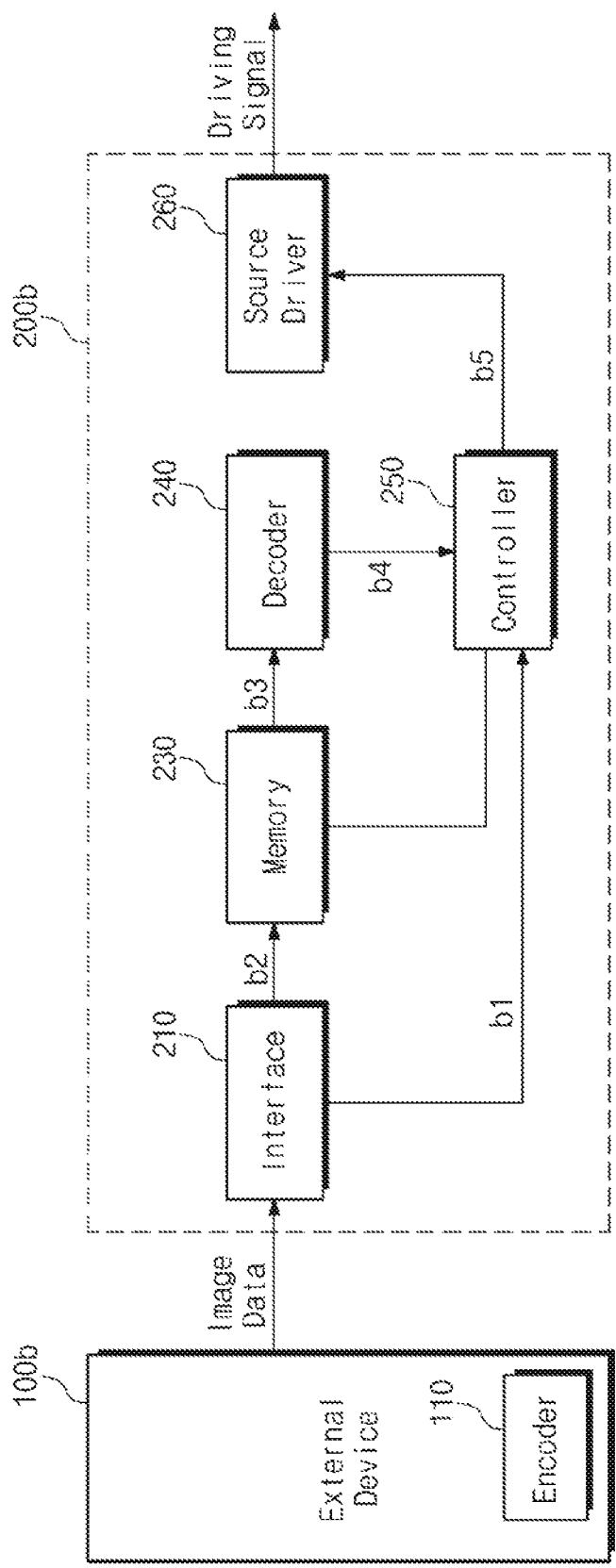
FIG. 9 is a conceptual diagram for describing an operation of a display driver circuit in a receive mode for receiving encoded data from an external device according to an exemplary embodiment of the inventive concept.

FIG. 9 is a conceptual diagram for describing an operation of a display driver circuit in a receive mode for receiving encoded data from an external device according to an exemplary embodiment of the inventive concept. For better understanding, FIG. 5 will be referenced together with FIG. 9.

Figure 10:
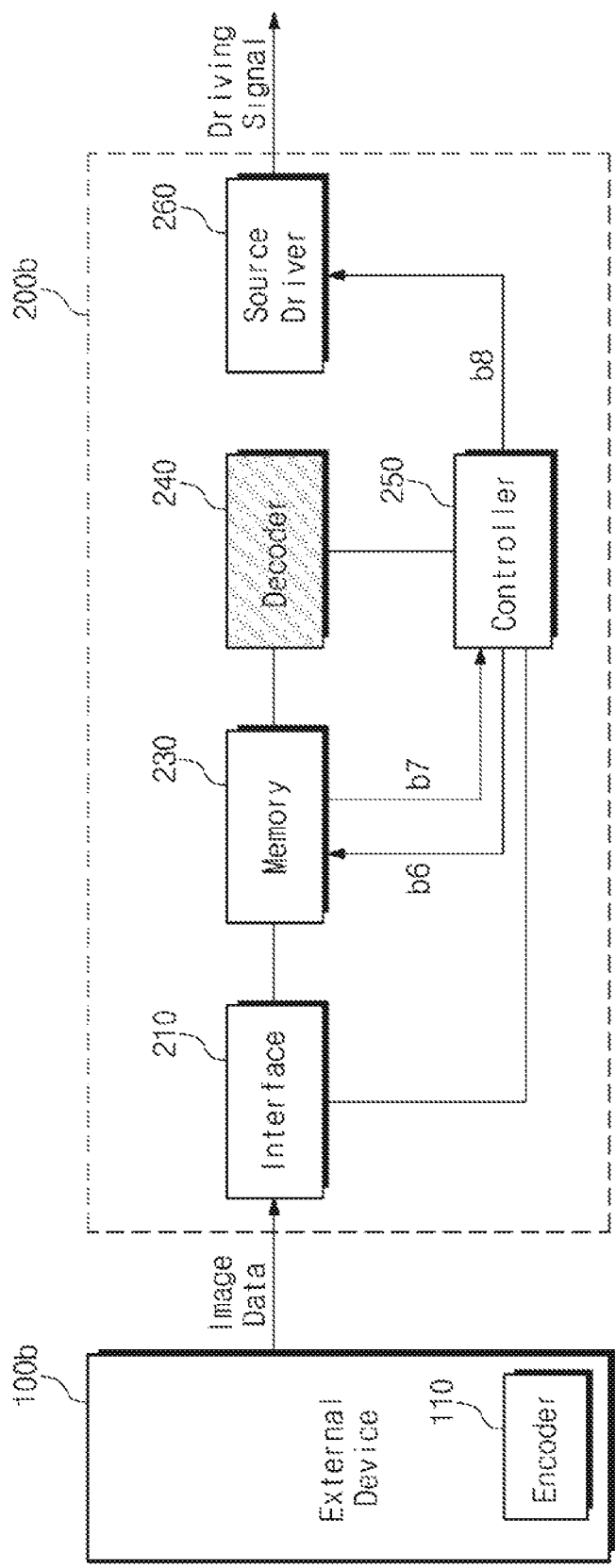
FIG. 10 is a block diagram for describing a method of processing data in a power saving mode after encoded data are received from an external device according to an exemplary embodiment of the inventive concept.
Figure 11:
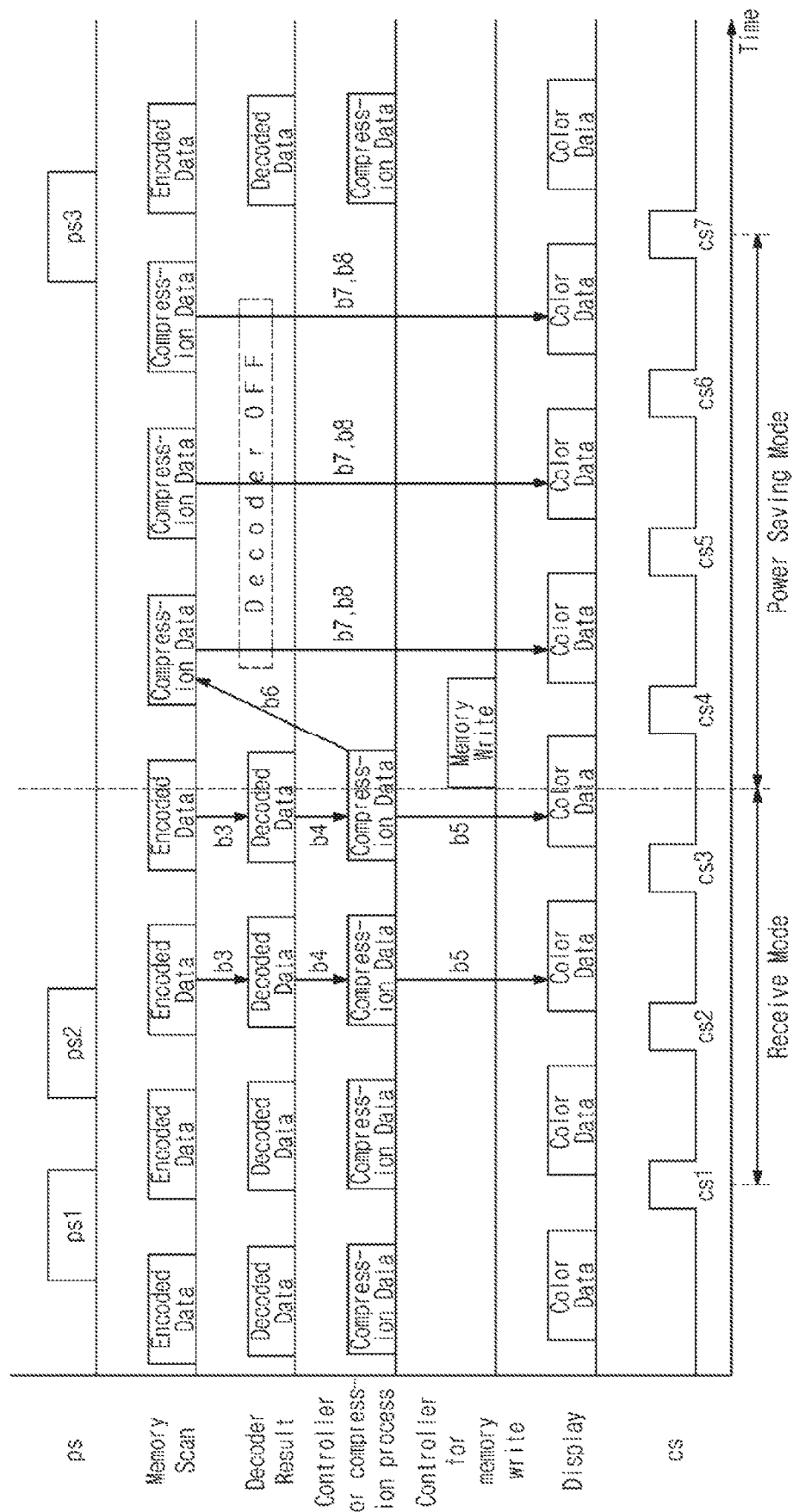
FIG. 11 is a timing diagram for describing an operation of a controller in the receive mode of FIG. 9 and in the power saving mode of FIG. 10 according to an exemplary embodiment of the inventive concept.

In descriptions of FIGS. 9 to 11, as an exemplary embodiment of the external device 100, an external device 100b may include an encoder 110. The full color data may be encoded to encoded data by the encoder 110. The external device 100b may transmit the encoded data. The encoded data may be N-bit data. The second data received from the external device 100b may be the encoded data. However, the inventive concept is not limited to the case where the second data are the encoded data.

When the encoded data are received from the external device 100b, the encoded data received from the external device 100b may be stored in the memory 230 without encoding. In this case, the encoder 220 of FIG. 6 may be controlled not to always operate.

In descriptions with reference to FIGS. 9 to 11, as an exemplary embodiment of the display driver circuit 200, a display driver circuit 200b may not include the encoder 220. Components of the display driver circuit 200b may operate to be identical or similar to the components 210, 230, 240, 250, and 260 of the display driver circuit 200 of FIG. 3.

In operation "b1", the interface 210 may transmit the second data received from the external device 100b to the controller 250. The controller 250 may control an operation of the decoder 240, depending on a type of the second data received. When the second data are encoded data, the controller 250 may control the decoder 240 such that the decoder 240 operates.

In operation "b2", the memory 230 may store data received from the interface 210.

In operation "b3", the decoder 240 may decode the data stored in the memory 230. The decoded data may be the full color data. The decoded data may be M-bit data.

In operation "b4", depending on the method described with reference to FIG. 4, the controller 250 may generate compression data by using the full color data. The compression data may be K-bit data. Additionally, the controller 250 may generate color data by using the compression data. The color data may be M-bit data.

In operation "b5", the controller 250 may output the color data to the source driver 260. The source driver 260 may receive the color data in response to the signal cs2. The source driver 260 may output the driving signal based on the color data. Depending on the driving signal, the source driver 260 may control the display panel 300 such that the second image 520 is displayed on the display panel 300.

When the third data are not received in response to the signal cs3, the data stored in the memory 230 in operation "b2" may be again used to display the third image 530. The display driver circuit 200b may display the third image 530 in the display panel 300 by repeating some of the operations performed to display the second image 520 in the display panel 300. The third image 530 may be displayed on the display panel 300 through operation "b3" to operation "b5".

FIG. 10 is a block diagram for describing a method of processing data in a power saving mode after encoded data are received from an external device according to an exemplary embodiment of the inventive concept. For better understanding, FIG. 5 will be referenced together with FIG. 10.

After the third image 530 is displayed, the controller 250 may operate in the power saving mode. In the power saving mode, the controller 250 may control the decoder 240 such that the decoder 240 does not operate.

In operation "b6", the controller 250 may control the memory 230 such that the compression data generated in the receive mode are stored in the memory 230. The compression data may be stored in the memory 230. The compression data stored in the memory 230 may be K-bit data.

In operation "b7", the controller 250 may use the compression data stored in the memory 230 to display the fourth image 540 in response to the signal cs4. Depending on the method described with reference to FIG. 4, the controller 250 may generate the color data by using the compression data.

In operation "b8", the controller 250 may output the color data to the source driver 260. The color data generated in operation "b8" may include the same information as the color data generated in operation "b4". Accordingly, the fourth image 540 may be displayed identically to the second image 520.

The compression data stored in the memory 230 in operation "b6" may be used to display the fifth image 550 and the sixth image 560 in response to the signals cs5 and cs6, respectively. The display driver circuit 200b may display the fifth image 550 and the sixth image 560 in the display panel 300 by repeating some of the operations performed to display the fourth image 540 in the display panel 300. The fifth image 550 and the sixth image 560 may be displayed one by one in the display panel 300 whenever operation "b7" and operation "b8" are repeated.

FIG. 11 is a timing diagram for describing an operation of the controller in the receive mode of FIG. 9 and in the power saving mode of FIG. 10 according to an exemplary embodiment of the inventive concept. For better understanding, FIGS. 9 and 10 will be referenced together with FIG. 11.

The transmit signal ps may be transmitted when data are transmitted from the external device 100b to the interface 210. For example, when the transmit signals ps1, ps2, and ps3 are received, the interface 210 may receive the first data, the second data, and the third data, respectively. Accordingly, when the transmit signals ps1 and ps2 are received, the display driver circuit 200b may operate in the receive mode. The display driver circuit 200b may operate in the power saving mode from a time when the transmit signal ps2 is received to a time when the transmit signal ps3 is received.

Depending on a speed at which data are received, the display driver circuit 200b may repeat an operation in the power saving mode and an operation in the receive mode. For example, when the transmit signal ps3 is received, the display driver circuit 200b may again operate in the receive mode. Additionally, when a new transmit signal is not received during the reference time after the transmit signal ps3 is received, the display driver circuit 200b may again operate in the power saving mode. In the receive mode, the display driver circuit 200b may perform operation "b1" to operation "b5" in response to the signal cs2. When the second data are received, the second image 520 may be displayed on the display panel 300 through operation "b1" to operation "b5". As in the above description, when the first data are received, the first image 510 may be displayed on the display panel 300 through operation "b1" to operation "b5".

When new data in response to the signal cs3 are not received from the external device 100b, the display driver circuit 200b may perform operation "b3" to operation "b5" in response to the signal cs3. In this case, since the second data stored in the memory 230 are used, operation "b1" and operation "b2" may be omitted. The third image 530 which is based on the second data may be displayed on the display panel 300 through operation "b3" to operation "b5".

After the third image 530 is displayed, the controller 250 may operate in the power saving mode. In the power saving mode, the controller 250 may control the decoder 240 such that the decoder 240 does not operate. Since the compression data generated in operation "b4" are used in the power saving mode, the decoder 240 may not operate.

In the power saving mode, the controller 250 may control the memory 230 in response to the signal cs4 such that the compression data generated in operation "b4" are stored in the memory 230. In operation "b6", the compression data generated in operation "b4" may be stored in the memory 230 under control of the controller 250. The controller 250 may perform operation "b7" and operation "b8" by using the compression data stored in the memory 230. Through operation "b6" to operation "b8", the fourth image 540 may be displayed based on the second data.

In the power saving mode, the controller 250 may repeat operation "b7" and operation "b8" depending on each of the signals cs5 and cs6. The controller 250 may repeat operation "b7" and operation "b8" in response to the control signal cs, until new data are received from the external device 100b.

Figure 12:
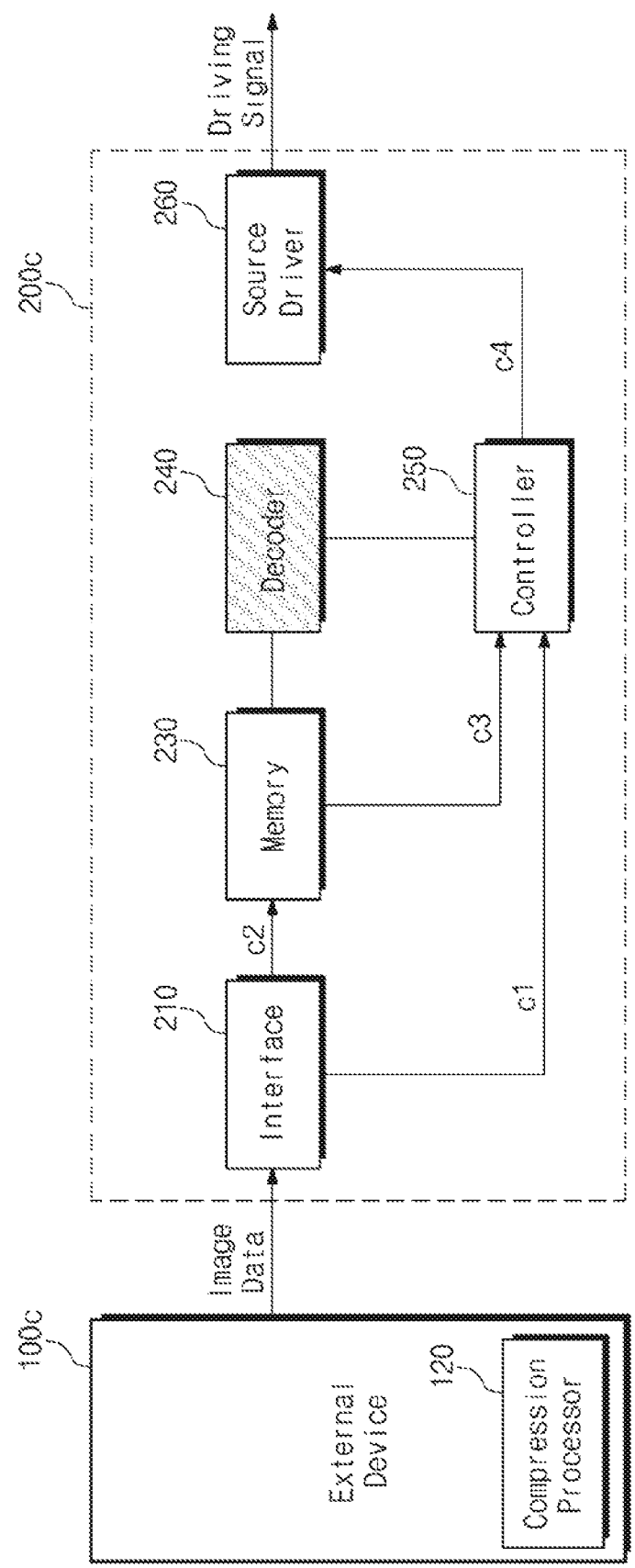
FIG. 12 is a conceptual diagram for describing an operation of a display driver circuit in a receive mode for receiving compressed data from an external device according to an exemplary embodiment of the inventive concept.

FIG. 12 is a conceptual diagram for describing an operation of a display driver circuit in a receive mode for receiving compressed data from an external device according to an exemplary embodiment of the inventive concept. For better understanding, FIG. 5 will be referenced together with FIG. 12.

Figure 13:
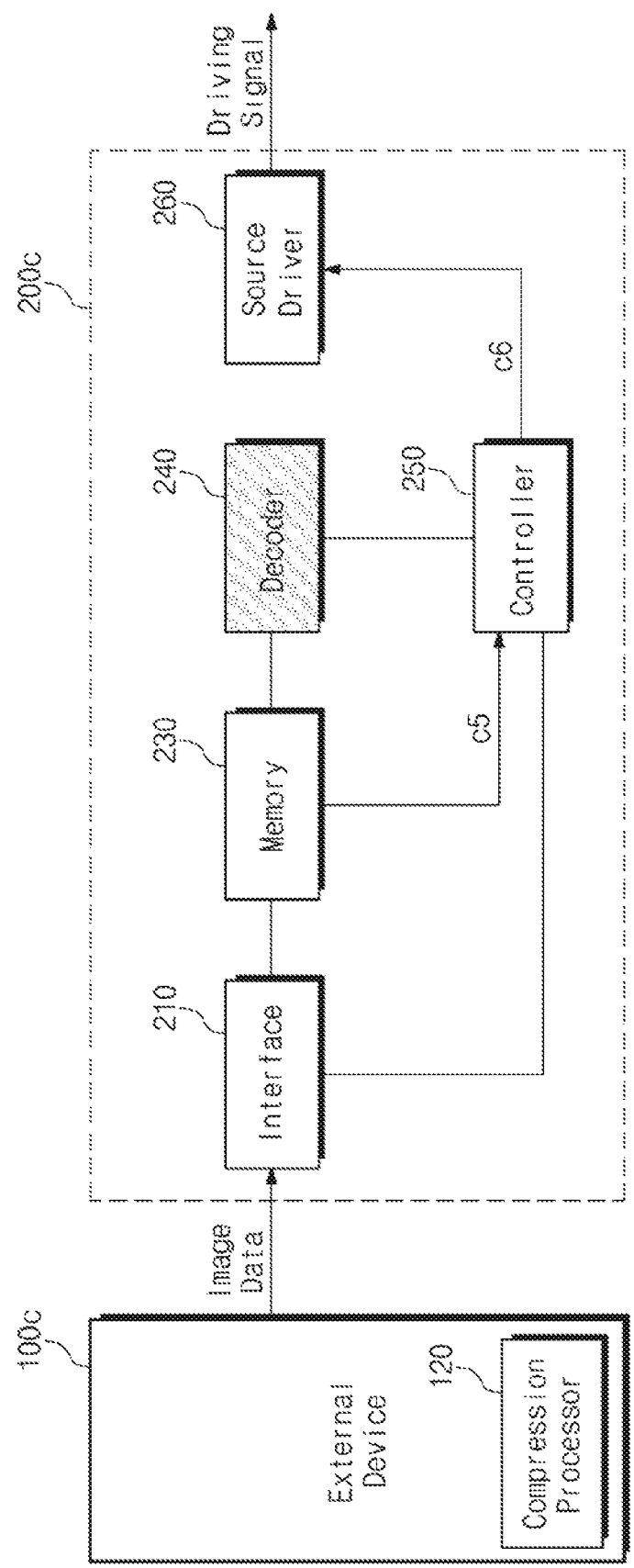
FIG. 13 is a block diagram for describing a method of processing data in a power saving mode after compressed data are received from an external device according to an exemplary embodiment of the inventive concept.
Figure 14:
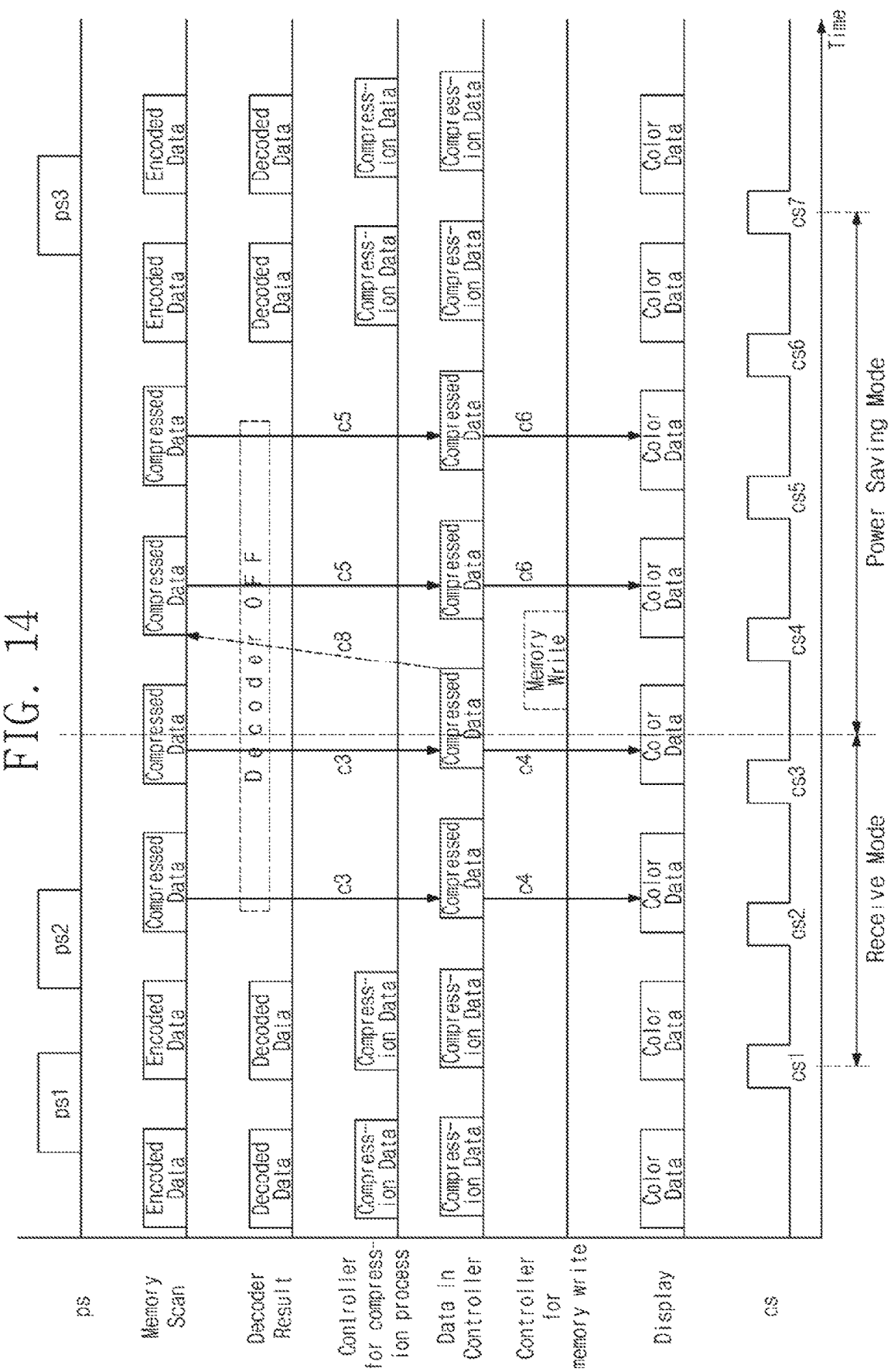
FIG. 14 is a timing diagram for describing an operation of a controller in the receive mode of FIG. 12 and in the power saving mode of FIG. 13 according to an exemplary embodiment of the inventive concept.

In the descriptions with reference to FIGS. 12 to 14, as an exemplary embodiment of the external device 100, an external device 100c may include a compression processor 120. The compression processor 120 may process full color data to generate compressed data. The compression processor 120 may generate the compressed data in a method which is identical or similar to the method in which the controller 250 generates the compression data. The compressed data may be K-bit data. The external device 100c may transmit the compressed data. The second data received from the external device 100c may be the compressed data. However, the inventive concept is not limited to the case where the second data are the compressed data.

When the compressed data are received from the external device 100c, the compressed data received from the external device 100c may be stored in the memory 230 without encoding. In this case, the encoder 220 of FIG. 6 may be controlled not to always operate. In the descriptions with reference to FIGS. 12 to 14, as an exemplary embodiment of the display driver circuit 200, a display driver circuit 200c may not include the encoder 220. Components of the display driver circuit 200c may operate to be identical or similar to the components 210, 230, 240, 250, and 260 of the display driver circuit 200 of FIG. 3.

The external device 100c may include the compression processor 120. The compression processor 120 may process full color data to generate compressed data. The compressed data may be generated in a method which is identical or similar to the method in which the controller 250 generates the compression data. The compressed data may be K-bit data. The external device 100c may transmit the compressed data.

In operation "c1", the interface 210 may transmit the second data received from the external device 100c to the controller 250. The controller 250 may control an operation of the decoder 240, depending on a type of the second data received. When the second data are the compressed data, the controller 250 may control the decoder 240 such that the decoder 240 does not operate. Referring to the method described with reference to FIG. 4, the compressed data may be converted to color data without a decoding process.

In operation "c2", the memory 230 may store data received from the interface 210.

In operation "c3", the controller 250 may not generate separate compression data. The controller 250 may use the compressed data stored in the memory 230 as the compression data. Depending on the method described with reference to FIG. 4, the controller 250 may generate the color data by using the compression data. The color data may be M-bit data.

In operation "c4", the controller 250 may output the color data to the source driver 260. The source driver 260 may receive the color data in response to the signal cs2. The source driver 260 may output the driving signal based on the color data. Depending on the driving signal, the source driver 260 may control the display panel 300 such that the second image 520 is displayed on the display panel 300.

When the third data are not received in response to the signal cs3, the data stored in the memory 230 in operation "c2" may be again used to display the third image 530. The display driver circuit 200c may display the third image 530 in the display panel 300 by repeating some of the operations performed to display the second image 520 in the display panel 300. The third image 530 may be displayed on the display panel 300 through operation "c3" and operation "c4".

FIG. 13 is a block diagram for describing a method of processing data in a power saving mode after compressed data are received from an external device according to an exemplary embodiment of the inventive concept. For better understanding, FIG. 5 will be referenced together with FIG. 13.

After the third image 530 is displayed, the controller 250 may operate in the power saving mode.

In operation "c5", the controller 250 may use compression data stored in the memory 230 to display the fourth image 540 in response to the signal cs4. Depending on the method described with reference to FIG. 4, the controller 250 may generate the color data by using the compression data.

In operation "c6", the controller 250 may output the color data to the source driver 260. The color data generated in operation "c6" may include the same information as the color data generated in operation "c3". Accordingly, the fourth image 540 may be displayed identically to the second image 520.

The compression data stored in the memory 230 in operation "c2" may be used to display the fifth image 550 and the sixth image 560 in response to the signals cs5 and cs6, respectively. The display driver circuit 200c may display the fifth image 550 and the sixth image 560 in the display panel 300 by repeating some of the operations performed to display the fourth image 540 in the display panel 300. The fifth image 550 and the sixth image 560 may be displayed one by one in the display panel 300 whenever operation "c5" and operation "c6" are repeated.

FIG. 14 is a timing diagram for describing an operation of the controller in the receive mode of FIG. 12 and in the power saving mode of FIG. 13 according to an exemplary embodiment of the inventive concept. For better understanding, FIGS. 12 and 13 will be referenced together with FIG. 14.

When data are transmitted from the external device 100c to the interface 210, the external device 100c may transmit the transmit signal ps. For example, when the transmit signals ps1, ps2, and ps3 are received, the interface 210 may receive the first data, the second data, and the third data, respectively. Accordingly, when the transmit signals ps1 and ps2 are received, the display driver circuit 200c may operate in the receive mode. The display driver circuit 200c may operate in the power saving mode from a time when the transmit signal ps2 is received to a time when the transmit signal ps3 is received.

Depending on a speed at which data are received, the display driver circuit 200c may repeat an operation in the power saving mode and an operation in the receive mode. For example, when the transmit signal ps3 is received, the display driver circuit 200c may again operate in the receive mode. Additionally, when a new transmit signal is not received during the reference time after the transmit signal ps3 is received, the display driver circuit 200c may again operate in the power saving mode. In the receive mode, the display driver circuit 200c may perform operation "c1" to operation "c4" depending on the signal cs2. The second image 520 may be displayed on the display panel 300 through operation "c1" to operation "c4".

When new data in response to the signal cs3 are not received from the external device 100c, the display driver circuit 200c may perform operation "c3" and operation "c4" depending on the signal cs3. In this case, since the second data stored in the memory 230 are used, operation "c1" and operation "c2" may be omitted. The third image 530 which is based on the second data may be displayed on the display panel 300 through operation "c3" and operation "c4".

After the third image 530 is displayed, the controller 250 may operate in the power saving mode. For example, the controller 250 may perform operation "c5" and operation "c6" by using the data stored in the memory 230 in operation "c2". As another example, in operation "c8", the controller 250 may control the memory 230 such that the compression data in operation "c3" are stored in the memory 230. The controller 250 may perform operation "c5" and operation "c6" by using the compression data stored in the memory 230 in operation "c8". The fourth image 540 which is based on the second data may be displayed through operation "c5" and operation "c6". In the power saving mode, the controller 250 may repeatedly perform operation "c5" and operation "c6" depending on the signals cs5 and cs6. The controller 250 may repeatedly perform operation "c5" and operation "c6" depending on the control signal cs, until new data are received from the external device 100c.

Figure 15:
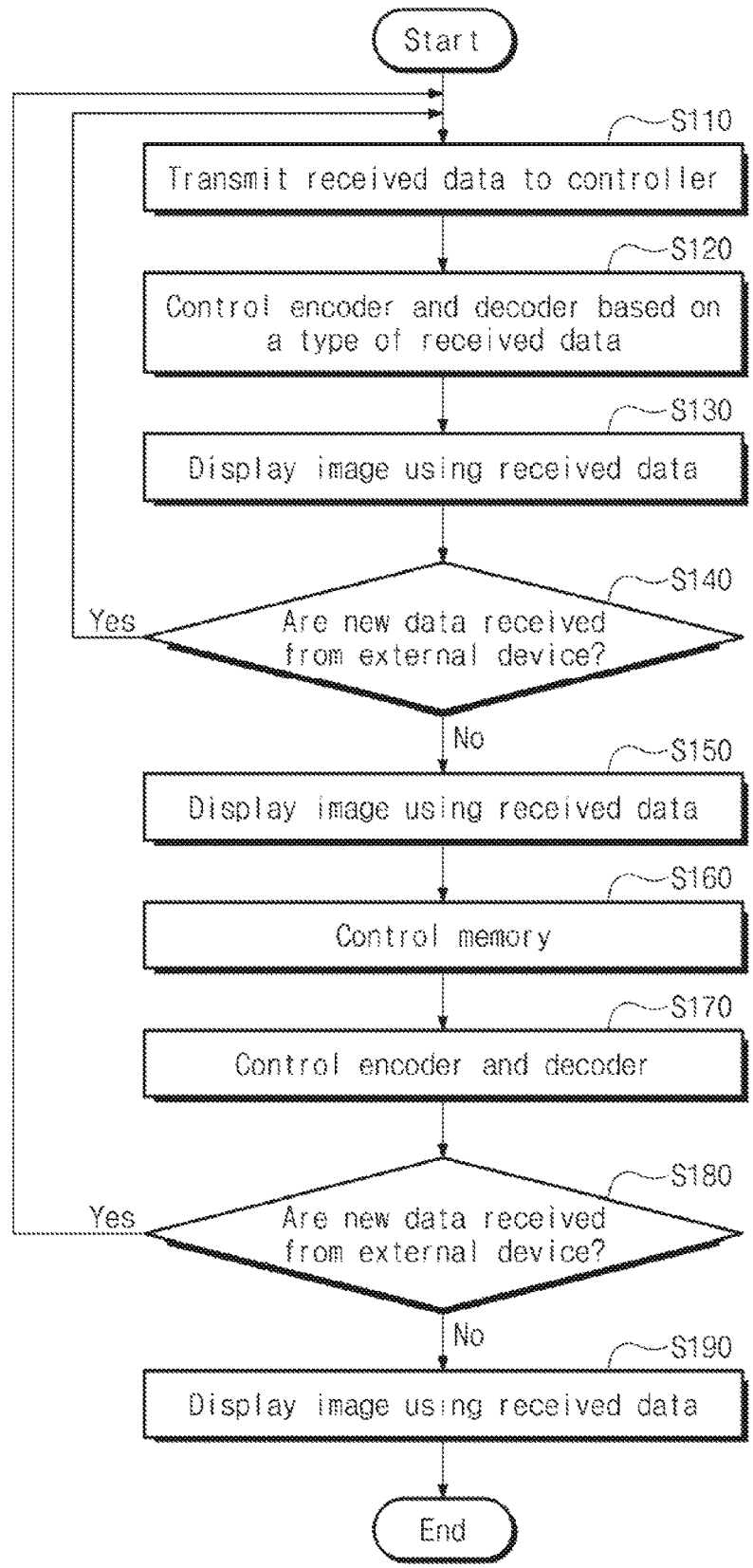
FIG. 15 is a flowchart for describing a method of displaying an image in the receive mode and in the power saving mode of FIG. 5 according to an exemplary embodiment of the inventive concept.

FIG. 15 is a flowchart for describing a method of displaying an image in the receive mode and in the power saving mode of FIG. 5 according to an exemplary embodiment of the inventive concept. For better understanding, FIGS. 6 to 14 will be referenced together with FIG. 15.

In operation S110, the interface 210 may transmit data received from the external device 100 to the controller 250. The received data may include information about a type of the received data.

In operation S120, the controller 250 may control the encoder 220 and the decoder 240, depending on the type of the received data. For example, the display driver circuit 200 may control the encoder 220 and the decoder 240, depending on the type of the second data.

For example, when the second data are the full color data, the controller 250 may control the encoder 220 and the decoder 240 such that the encoder 220 and the decoder 240 operate. As another example, when the second data are the encoded data, the controller 250 may control the encoder 220 such that the encoder 220 does not operate. Additionally, the controller 250 may control the decoder 240 such that the decoder 240 does not operate. As another example, when the second data are the compressed data, the controller 250 may control the encoder 220 and the decoder 240 such that the encoder 220 and the decoder 240 do not operate.

Accordingly, in the receive mode, power consumption of the display driver circuit 200 when data received from the external device 100 are the encoded data may be smaller than power consumption of the display driver circuit 200 when data received from the external device 100 are the full color data. In the receive mode, power consumption of the display driver circuit 200 when data received from the external device 100 are the compressed data may be smaller than power consumption of the display driver circuit 200 when data received from the external device 100 are the encoded data.

In operation S130, the display driver circuit 200 may display an image based on the received data. The display driver circuit 200 may operate in response to the control signal cs.

For example, when the second data are the full color data, the display driver circuit 200 may perform operation "a2" to operation "a6" to display the second image 520 in response to the signal cs2. As another example, when the second data are the encoded data, the display driver circuit 200 may perform operation "b2" to operation "b5" to display the second image 520 in response to the signal cs2. As another example, when the second data are the compressed data, the display driver circuit 200 may perform operation "c2" to operation "c4" to display the second image 520 in response to the signal cs2.

In operation S140, the controller 250 may determine whether new data are received from the external device 100, based on the control signal cs. For example, it may be determined whether new data are received from the external device 100 in response to the control signal cs3.

When new data are received from the external device 100 in response to a control signal (S140: Yes), the display driver circuit 200 may return to operation S110.

When new data are not received from the external device 100 in response to a control signal (S140: No), the display driver circuit 200 may display an image based on the received data. For example, the display driver circuit 200 may display the third image 530, based on the second data.

For example, when the second data are the full color data, the display driver circuit 200 may perform operation "a4" to operation "a6" to display the third image 530 in response to the signal cs3. As another example, when the second data are the encoded data, the display driver circuit 200 may perform operation "b2" to operation "b5" to display the third image 530 in response to the signal cs3. As another example, when the second data are the compressed data, the display driver circuit 200 may perform operation "c3" and operation "c4" to display the third image 530 in response to the signal cs3.

In operation S160, the controller 250 may control the memory 230 based on the type of the received data such that the compression data are stored in the memory 230. The compression data stored in the memory 230 may be used to display the fourth image 540 while new data are not received from the external device 100.

For example, when the second data are the full color data, the controller 250 may generate the compression data in operation "a5". In operation "a6", the controller 250 may control the memory 230 such that the compression data are stored in the memory 230. As another example, when the second data are the encoded data, the controller 250 may generate the compression data in operation "b4". In operation "b5", the controller 250 may control the memory 230 such that the compression data are stored in the memory 230. As another example, when the second data are the compressed data, the display driver circuit 200 may use the compressed data stored in the memory 230 as the compression data without generating separate compression data. The controller 250 may use the compression data stored in the memory 230 without an operation of controlling the memory 230 such that the compression data are stored in the memory 230.

In operation S170, when new data are not received from the external device 100 in response to a control signal, the controller 250 may control the encoder 220 and the decoder 240. The controller 250 may control the encoder 220 and the decoder 240 such that the encoder 220 and the decoder 240 do not operate.

In operation S180, the controller 250 may determine whether new data are received from the external device 100, based on the control signal cs. For example, it may be determined whether new data are received from the external device 100 in response to the signal cs4.

When new data are received from the external device 100 in response to a control signal (S180: Yes), the display driver circuit 200 may return to operation S110.

When new data are not received from the external device 100 in response to a control signal (S180: No), in operation S190, the display driver circuit 200 may display an image based on the received data. For example, the display driver circuit 200 may display the fourth image 540, based on the second data.

For example, when the second data are the full color data, the display driver circuit 200 may perform operation "a8" and operation "a9" to display the fourth image 540 in response to the signal cs4. As another example, when the second data are the encoded data, the display driver circuit 200 may perform operation "b7" and operation "b8" to display the fourth image 540 in response to the signal cs4. As another example, when the second data are the compressed data, the display driver circuit 200 may perform operation "c5" and operation "c6" to display the fourth image 540 in response to the signal cs4.

As described above, according to exemplary embodiments of the inventive concept, in a low-power mode, some components in a display driver circuit may be controlled not to operate. Accordingly, power consumption of the display driver circuit may be reduced.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A display driver circuit configured to drive a display panel, the display driver circuit comprising:
 a memory configured to store image data including first data from outside of the display driver circuit and second data from a controller circuit;
 a decoder circuit configured to generate first color data by decoding the first data in the memory;
 the controller circuit configured to generate second color data based on the second data in the memory; and
 a source driver circuit configured to output a driving signal based on the first color data or the second color data;

wherein, in a first mode, the first color data are provided to the source driver circuit, and in a second mode, the second color data are provided to the source driver circuit without being decoded by the decoder circuit, wherein, when the first mode is switched to the second mode, the first color data is same as the second color data, and wherein in the second mode, the controller circuit is further configured to control the decoder circuit such that the decoder circuit does not operate.

2. The display driver circuit of claim 1, wherein:

in the first mode, the controller circuit is further configured to generate compression data based on the first color data and to generate third color data based on the compression data, and wherein a size of the compression data is smaller than a size of the first color data in the first mode.

3. The display driver circuit of claim 2, wherein bits included in the compression data are selected from bits included in the first color data.

4. The display driver circuit of claim 2, wherein all or some bits included in the third color data are obtained from bits included in the compression data.

5. The display driver circuit of claim 2, wherein colors expressed by the third color data are based on colors expressed by the first color data.

6. The display driver circuit of claim 2, wherein:

in the second mode, the controller circuit is further configured to generate the second color data based on compression data stored in the memory.

7. The display driver circuit of claim 6, wherein all or some bits included in the second color data are obtained from bits included in the compression data.

8. The display driver circuit of claim 1, wherein:

while a first image corresponding to the first color data is displayed on the display panel in the first mode, when third data from the outside of the display driver circuit are not stored in the memory after the first data are stored in the memory, the display driver circuit is configured to operate in the second mode.

9. The display driver circuit of claim 1, wherein:

when third data from the outside of the display driver circuit are stored in the memory after the first data are stored in the memory, the display driver circuit is configured to operate in the first mode.

10. The display driver circuit of claim 1, wherein power consumption of the display driver circuit in the second mode is smaller than power consumption of the display driver circuit in the first mode.

* * * * *